(12) United States Patent
Taylor et al.

(10) Patent No.: US 7,853,480 B2
(45) Date of Patent: Dec. 14, 2010

(54) SYSTEM AND METHOD FOR PROVIDING EXPORT SERVICES TO MERCHANTS

(75) Inventors: Thomas B. Taylor, Kirkland, WA (US); Jason W. Murray, Bellevue, WA (US); Ankit Patel, Seattle, WA (US); John R. Ehrhardt, Newcastle, WA (US); Karpagavalli Jaykumar, Redmond, WA (US); Kimberly Awalt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 91 days.

(21) Appl. No.: 11/751,433

(22) Filed: May 21, 2007

(65) Prior Publication Data

US 2008/0294536 A1   Nov. 27, 2008

(51) Int. Cl.
  *G06Q 1/14* (2006.01)
(52) U.S. Cl. .................. 705/22; 705/1; 705/26
(58) Field of Classification Search ........... 705/1, 705/22, 26
  See application file for complete search history.

(56) References Cited

U.S. PATENT DOCUMENTS

| | | | | |
|---|---|---|---|---|
| 4,114,601 A | * | 9/1978 | Abels | 600/20 |
| 4,774,657 A | * | 9/1988 | Anderson et al. | 1/1 |
| 5,190,059 A | * | 3/1993 | Fabian et al. | 128/899 |
| 5,315,709 A | * | 5/1994 | Alston et al. | 1/1 |
| 5,513,110 A | * | 4/1996 | Fujita et al. | 701/207 |
| 5,519,818 A | * | 5/1996 | Peterson | 345/642 |
| 5,560,007 A | * | 9/1996 | Thai | 1/1 |
| 5,560,014 A | * | 9/1996 | Imamura | 717/108 |
| 5,664,172 A | * | 9/1997 | Antoshenkov | 707/700 |
| 5,664,173 A | * | 9/1997 | Fast | 707/694 |
| 5,715,314 A | | 2/1998 | Payne et al. | |
| 5,745,894 A | * | 4/1998 | Burrows et al. | 1/1 |
| 5,761,652 A | * | 6/1998 | Wu et al. | 1/1 |
| 5,778,354 A | * | 7/1998 | Leslie et al. | 1/1 |

(Continued)

OTHER PUBLICATIONS

"Free Merchant (Company Business and Marketing)", Oct. 17, 2000, PC Magazine, vol. 19 No. 18, pp. 153.*

(Continued)

*Primary Examiner*—Matthew S Gart
*Assistant Examiner*—Talia Crawley
(74) *Attorney, Agent, or Firm*—Robert C. Kowert; Meyertons, Hood, Kivlin, Kowert & Goetzel, P.C.

(57) ABSTRACT

A fulfillment services provider may offer export services to merchants, including generation of required export documentation; calculation, collection, and remittance of customs duties; and transportation via an international carrier. Such export services may be offered through a registration service, and may be integrated with other fulfillment services provided to registered merchants (e.g., domestic order fulfillment and/or warehousing of inventory), or may be offered to merchants that do not receive other fulfillment services from the provider. Export services may be provided to merchants who certify that all registered or specified items may be legally exported to all (or specified) international destinations, or the provider may verify compliance to export regulations on behalf of registered merchants. The provider may assume the role of Principal Party in Interest for registered merchants or the merchants may retain this role. Registration and provision of export services may be implemented in one or more software modules.

48 Claims, 10 Drawing Sheets

U.S. PATENT DOCUMENTS

| | | | |
|---|---|---|---|
| 5,812,996 A * | 9/1998 | Rubin et al. | 1/1 |
| 5,838,365 A * | 11/1998 | Sawasaki et al. | 348/169 |
| 5,873,079 A * | 2/1999 | Davis et al. | 1/1 |
| 5,884,304 A * | 3/1999 | Davis et al. | 1/1 |
| 5,884,307 A * | 3/1999 | Depledge et al. | 1/1 |
| 5,893,088 A * | 4/1999 | Hendricks et al. | 707/696 |
| 5,903,876 A * | 5/1999 | Hagemier | 705/19 |
| 5,909,492 A | 6/1999 | Payne et al. | |
| 5,915,251 A * | 6/1999 | Burrows et al. | 707/700 |
| 5,930,785 A * | 7/1999 | Lohman et al. | 1/1 |
| 5,931,824 A * | 8/1999 | Stewart et al. | 604/358 |
| 5,953,707 A * | 9/1999 | Huang et al. | 705/10 |
| 5,960,411 A | 9/1999 | Hartman et al. | |
| 5,961,572 A * | 10/1999 | Craport et al. | 701/207 |
| 5,963,956 A * | 10/1999 | Smartt | 1/1 |
| 6,003,016 A * | 12/1999 | Hagemier | 705/19 |
| 6,029,141 A | 2/2000 | Bezos et al. | |
| 6,038,559 A * | 3/2000 | Ashby et al. | 1/1 |
| 6,061,677 A * | 5/2000 | Blinn et al. | 1/1 |
| 6,076,007 A * | 6/2000 | England et al. | 600/424 |
| 6,078,899 A * | 6/2000 | Francisco et al. | 705/19 |
| 6,088,648 A * | 7/2000 | Shah et al. | 701/117 |
| 6,092,115 A * | 7/2000 | Choudhury et al. | 709/235 |
| 6,101,482 A | 8/2000 | DiAngelo et al. | |
| 6,105,019 A * | 8/2000 | Burrows | 1/1 |
| 6,141,656 A * | 10/2000 | Ozbutun et al. | 1/1 |
| 6,154,219 A * | 11/2000 | Wiley et al. | 345/587 |
| 6,175,835 B1 * | 1/2001 | Shadmon | 707/696 |
| 6,195,656 B1 * | 2/2001 | Ozbutun et al. | 1/1 |
| 6,199,201 B1 * | 3/2001 | Lamping et al. | 717/114 |
| 6,205,447 B1 * | 3/2001 | Malloy | 1/1 |
| 6,223,215 B1 | 4/2001 | Hunt et al. | |
| 6,289,334 B1 * | 9/2001 | Reiner et al. | 1/1 |
| 6,298,170 B1 * | 10/2001 | Morita et al. | 382/278 |
| 6,353,819 B1 * | 3/2002 | Edwards et al. | 1/1 |
| 6,353,832 B1 * | 3/2002 | Acharya et al. | 1/1 |
| 6,366,206 B1 * | 4/2002 | Ishikawa et al. | 340/573.1 |
| 6,400,272 B1 * | 6/2002 | Holtzman et al. | 340/572.1 |
| 6,405,176 B1 | 6/2002 | Toohey | |
| 6,424,262 B2 * | 7/2002 | Garber et al. | 340/572.3 |
| 6,438,528 B1 * | 8/2002 | Jensen et al. | 705/44 |
| 6,449,599 B1 | 9/2002 | Payne et al. | |
| 6,470,287 B1 * | 10/2002 | Smartt | 702/102 |
| 6,487,549 B1 * | 11/2002 | Amundsen | 1/1 |
| 6,510,423 B1 * | 1/2003 | Ichikawa et al. | 1/1 |
| 6,529,903 B2 * | 3/2003 | Smith et al. | 1/1 |
| 6,546,373 B1 * | 4/2003 | Cerra | 705/19 |
| 6,571,250 B1 * | 5/2003 | Hara | 1/1 |
| 6,587,827 B1 | 7/2003 | Hennig et al. | |
| 6,591,270 B1 * | 7/2003 | White | 1/1 |
| 6,600,418 B2 * | 7/2003 | Francis et al. | 340/572.1 |
| 6,622,127 B1 | 9/2003 | Kiots et al. | |
| 6,636,849 B1 * | 10/2003 | Tang et al. | 1/1 |
| 6,640,214 B1 * | 10/2003 | Nambudiri et al. | 705/26 |
| 6,669,089 B2 * | 12/2003 | Cybulski et al. | 235/385 |
| 6,725,222 B1 | 4/2004 | Musgrove et al. | |
| 6,735,590 B1 * | 5/2004 | Shoup et al. | 1/1 |
| 6,768,419 B2 * | 7/2004 | Garber et al. | 340/572.4 |
| 6,809,645 B1 * | 10/2004 | Mason | 340/572.1 |
| 6,845,364 B1 * | 1/2005 | Pool et al. | 705/26 |
| 6,861,954 B2 * | 3/2005 | Levin | 340/572.1 |
| 6,873,968 B2 | 3/2005 | Ehrlich et al. | |
| 6,900,731 B2 * | 5/2005 | Kreiner et al. | 340/572.1 |
| 7,010,507 B1 * | 3/2006 | Anderson et al. | 705/31 |
| 7,010,522 B1 * | 3/2006 | Jagadish et al. | 1/1 |
| 7,019,650 B2 * | 3/2006 | Volpi et al. | 340/572.1 |
| 7,050,938 B1 | 5/2006 | Prater et al. | |
| 7,142,118 B2 * | 11/2006 | Hamilton et al. | 340/572.1 |
| 7,155,402 B1 * | 12/2006 | Dvorak | 705/10 |
| 7,177,829 B1 * | 2/2007 | Wilson et al. | 705/31 |
| 7,222,087 B1 | 5/2007 | Payne et al. | |
| 7,236,173 B2 * | 6/2007 | Chithambaram et al. | 345/440 |
| 7,307,530 B2 * | 12/2007 | Fabian et al. | 340/572.1 |
| 7,370,009 B1 | 5/2008 | Notani et al. | |
| 7,406,472 B2 * | 7/2008 | Manucha et al. | 707/10 |
| 7,557,710 B2 * | 7/2009 | Sanchez et al. | 340/572.1 |
| 2002/0007360 A1 * | 1/2002 | Hawkinson | 707/4 |
| 2002/0067263 A1 * | 6/2002 | Tafoya et al. | 340/572.1 |
| 2002/0138496 A1 | 9/2002 | Schambach et al. | |
| 2002/0143320 A1 * | 10/2002 | Levin | 606/1 |
| 2002/0178074 A1 | 11/2002 | Bloom | |
| 2003/0033205 A1 | 2/2003 | Nowers et al. | |
| 2003/0066537 A1 * | 4/2003 | Fabian et al. | 128/899 |
| 2003/0069831 A1 * | 4/2003 | Le et al. | 705/37 |
| 2003/0083949 A1 | 5/2003 | Kar | |
| 2003/0105394 A1 * | 6/2003 | Fabian et al. | 600/407 |
| 2003/0115072 A1 * | 6/2003 | Manucha et al. | 705/1 |
| 2003/0171962 A1 | 9/2003 | Hirth et al. | |
| 2003/0172007 A1 | 9/2003 | Helmott et al. | |
| 2003/0187867 A1 * | 10/2003 | Smartt | 707/102 |
| 2004/0064351 A1 | 4/2004 | Mikurak | |
| 2004/0084525 A1 * | 5/2004 | Kreiner et al. | 235/384 |
| 2004/0111286 A1 | 6/2004 | Koenig et al. | |
| 2004/0117337 A1 * | 6/2004 | Beck et al. | 707/1 |
| 2004/0129279 A1 * | 7/2004 | Fabian et al. | 128/899 |
| 2004/0201479 A1 * | 10/2004 | Garber et al. | 340/572.1 |
| 2004/0250819 A1 * | 12/2004 | Blair et al. | 128/899 |
| 2004/0254842 A1 | 12/2004 | Kirkegaard | |
| 2005/0006456 A1 | 1/2005 | White | |
| 2005/0033671 A1 * | 2/2005 | Hahn-Carlson | 705/34 |
| 2005/0081151 A1 | 4/2005 | Van Der Meer | |
| 2005/0114222 A1 | 5/2005 | Mundy | |
| 2005/0125312 A1 | 6/2005 | Dearing et al. | |
| 2005/0154904 A1 * | 7/2005 | Perepa et al. | 713/193 |
| 2006/0036504 A1 * | 2/2006 | Allocca et al. | 705/26 |
| 2006/0089897 A1 | 4/2006 | Maas et al. | |
| 2006/0116936 A1 | 6/2006 | Lucas | |
| 2006/0122892 A1 | 6/2006 | Fletcher et al. | |
| 2006/0122897 A1 | 6/2006 | Fletcher et al. | |
| 2006/0190362 A1 | 8/2006 | Krystek et al. | |
| 2006/0195364 A1 | 8/2006 | Shroff et al. | |
| 2007/0078725 A1 | 4/2007 | Koszewski et al. | |
| 2007/0093709 A1 * | 4/2007 | Abernathie | 600/407 |
| 2007/0094510 A1 | 4/2007 | Ross et al. | |
| 2007/0143206 A1 | 6/2007 | Cui et al. | |
| 2007/0290030 A1 * | 12/2007 | Fox et al. | 235/375 |

OTHER PUBLICATIONS

TradeBeam Names VP, Aug. 30, 2006, Traffic World, pp. 1.*
International Search Report for PCT/US 08/64188, mailed Sep. 8, 2008.
Cohen, "Electronic Commerce," Information Sciences Institute Research Report ISI/RR-89-244, Oct. 1989, 46 pages.
Amazon Advantage Membership Agreement, Instructions & Rules, Dec. 6, 2004, downloaded from web.archive. org/web/20041211005149/www.amazon.com/exec/obidos/subst/partners/direct/direct-agreement.html, 9 pages.
Amazon Advantage Overview, downloaded from web.archive.org/web/20041024162213/http://www.amazon.com/exec/obidos/subst/partners/direct/advantage/homt.html/, 2 pages.
Amazon.com Press Release, "Target and Amazon.com team to advance e-commerce initiatives," Sep. 11, 2001, 2 pages.
Amazon.com Press Release,"Target to deliver four unique brands in one comprehensive site at target.com," Aug. 12, 2002, 2 pages.
U.S. Appl. No. 11/852,040, filed Sep. 7, 2007.
U.S. Appl. No. 11/351,881, filed Feb. 10, 2006.
U.S. Appl. No. 11/958,852, filed Dec. 18, 2007.
U.S. Appl. No. 12/037,707, filed Feb. 26, 2008.
U.S. Appl. No. 11/756,160, filed May 31, 2007.

* cited by examiner

| Ship to: John Q. Customer 100 Main St. Anytown, USA 12345 | | Packing slip <u>500</u> |
|---|---|---|
| Contents of this shipment: | | |
| Item | Quantity | Price |
| Item A | 1 | 10.00 |
| Item B | 1 | 12.00 |
| Offered by: Merchant A | | |
| Item C | 1 | 23.00 |
| Offered by: Merchant B | | |
| Item D | 1 | 5.00 |
| Offered by: Merchant C | | |
| | Shipping: | Free |
| | Total: | 50.00 |

*FIG. 7A*

| Ship to: John Q. Customer 100 High St. Oldtown ABC123 UNITED KINGDOM | | Packing slip <u>501</u> 1 of 3 |
|---|---|---|
| Contents of this shipment: | | |
| Item | Quantity | Price |
| Item A | 1 | 10.00 |
| Item B | 1 | 12.00 |
| Offered by: Merchant A | | |
| Import fees deposit | | 3.00 |
| | Shipping: | 7.00 |
| | Total: | 32.00 |

*FIG. 7B*

```
From:
Merchant ABC
1000 Industrial Blvd.
Metropolis, TX 77777
USA
```
                                                                                    shipping label 500 transportation tracking barcode
510

```
Ship to:
John Q. Customer
100 High St.
Oldtown ABC123
UNITED KINGDOM
``` unique print authorization barcode
520
                                                                                    export form CN 22 530

| Customs – CN 22 May be opened officially See Instructions on Reverse | |
|---|---|
| cut Detailed Description of Contents: | Value (US $) |
| 4901.99.0070 – Book – New (count 1) | 10.00 |
|  |  |
|  |  |
| Freight and Insurance | 8.00 |
| Weight  1.27 pounds | Total: 18.00 | cut line 535

☐ Gift    ■ Merchandise    ☐ Commercial Sample

I certify that this item does not contain any dangerous article prohibited by postal regulations.

_____
(Signature)                    CN 22

*FIG. 7C*

SYSTEM AND METHOD FOR PROVIDING EXPORT SERVICES TO MERCHANTS

BACKGROUND OF THE INVENTION

1. Field of the Invention

This invention relates to computer-implemented registration for export services and, more particularly, to computer-implemented techniques for offering export services to merchants.

2. Description of the Related Art

In order to offer customers a variety of items readily available for delivery, many merchants (whether engaging in electronic or conventional "brick and mortar" commerce) hold various quantities of such items within inventory facilities. Keeping items in inventory may serve to buffer variations in customer demand or a manufacturer or distributor's ability to supply various items. For example, different items offered for sale by a merchant may have different manufacturer lead times. Holding quantities of such items as inventory may enable a merchant to offer consistent availability of these items to customers despite the different lead times.

However, in some circumstances, holding inventory may present various costs or disadvantages to a merchant. For example, inventory storage facilities may be expensive to provision and maintain, particularly for smaller merchants who may not be able to efficiently and profitably distribute the fixed costs of such facilities across a limited quantity of inventory. Moreover, should the need arise, scaling an inventory system to accommodate increased demand or volume may be an expensive proposition requiring substantial investment in technology, facilities and/or staffing.

A merchant's holding his or her own inventory may also present disadvantages to customers. As electronic commerce grows in popularity, many merchants increasingly list their offerings along with other merchants via electronic marketplaces that provide a common interface through which customers may search for items and place orders. However, if different merchants are ultimately responsible for fulfilling their own respective orders through such a marketplace, the customer's ordering experience for a given item may vary considerably depending on the merchant from which the item is ordered. For example, a merchant that has little skill or poor processes for order fulfillment may be slow to ship an item, may ship the wrong item, may deliver damaged goods, or may otherwise create a negative customer experience. Such a negative experience may reflect not only on the merchant from whom the customer ordered, but also on other merchants in the electronic marketplace, possibly decreasing customer confidence in the marketplace itself.

Similarly, a merchant that has little or no experience with international commerce, or with the regulations applied to export of goods to other countries and regions of the world, may find it difficult and expensive to support fulfillment of orders for goods to be delivered outside the country. Such merchants may choose to forgo expansion of their businesses outside the United States, and therefore to pass up opportunities for additional revenues that could be generated in other markets.

SUMMARY

Various embodiments of a method and system for offering export services to merchants are disclosed. According to one embodiment, a system may include a memory configured to store instructions and one or more processors coupled to the memory. The instructions may be executable by at least one of the processors to implement an inventory management system that may be configured to implement a registration interface; receive, from a merchant via the registration interface, a request to receive export services from a fulfillment services provider for one or more inventory items; determine whether the request is valid; and in response to determining that the request is valid, store information indicating that the inventory items are registered for export services.

In various embodiments, determining if the request for export services is valid may include prompting the merchant to indicate that the inventory items may be legally exported; comparing an identifier of the merchant to one or more lists of merchants restricted from exporting items; implementing a criminal background check, credit check or authentication of the identity of the merchant; comparing an identifier of each of the inventory items to one or more lists of items restricted from export to one or more destinations, entities, or persons; and/or prompting the merchant to indicate that he or she agrees to comply with applicable export regulations.

If the request for export services is valid, the inventory management service may in some embodiments be configured to store an indication that the merchant has successfully registered for export services for the one or more inventory items (or a subset determined to be exportable). The inventory management service may also be configured to prompt the merchant to provide a signature that may be stored for use in generating export documentation for orders including the one or more inventory items registered for export services.

The inventory management service may be configured to receive orders from customers for one or more of the inventory items registered for export services that include an international delivery destination. The inventory management service may be configured to determine if the order is valid, and in response to determining that the order is valid, may generate any or all applicable export documentation on behalf of the merchant and may initiate delivery of the order to the international delivery destination. In some embodiments, to determine that the order is valid, the inventory management system may be configured to compare identifiers of the items in the order, an identifier of a person or entity receiving the order, and/or the destination to one or more lists of items restricted for export to particular destinations, entities, or persons. Export documentation generated by the inventory management system may in various embodiments include information identifying the Principal Party in Interest and the ultimate consignee, information regarding the transportation method and port of export and/or unloading, identifiers of the items included in a shipment, an export license number or exception symbol, and/or a stored merchant signature. A physical copy of the generated export documentation may be attached to a shipping container for the order and/or the generated export documentation may be provided in physical or electronic form to a carrier selected to transport the order to its international delivery destination.

In some embodiments, if an order for export is received that includes registered inventory items from two or more merchants, the inventory management system may be configured to ship the items together with one set of export documentation indicating that the fulfillment services provider is the exporter of record. In other embodiments, if an order for export is received that includes registered inventory items from two or more merchants, the inventory management system may be configured to generate separate export documentation on behalf of each of the merchants (each assuming the role of exporter of record for his or her own inventory items) and ship the items from each merchant separately, along with their respective export documentation.

The inventory management system may in some embodiments be configured to calculate any applicable customs duties owed to various taxing authorities and to collect those duties when collecting payment for order fulfillment services that include export services. The duties collected may also be remitted to the appropriate taxing authorities automatically by the inventory management service, in some embodiments.

BRIEF DESCRIPTION OF THE DRAWINGS

FIG. 7A illustrates one embodiment of a packing slip that may be included in a package resulting from the order fulfillment methods of FIG. 5.

FIG. 7B illustrates one embodiment of a packing slip that may be included in a package resulting from the order fulfillment methods of FIG. 6.

FIG. 7C illustrates a shipping label, including an export form CN 22, generated by a fulfillment services provider on behalf of a merchant, according to one embodiment.

Figure 1:
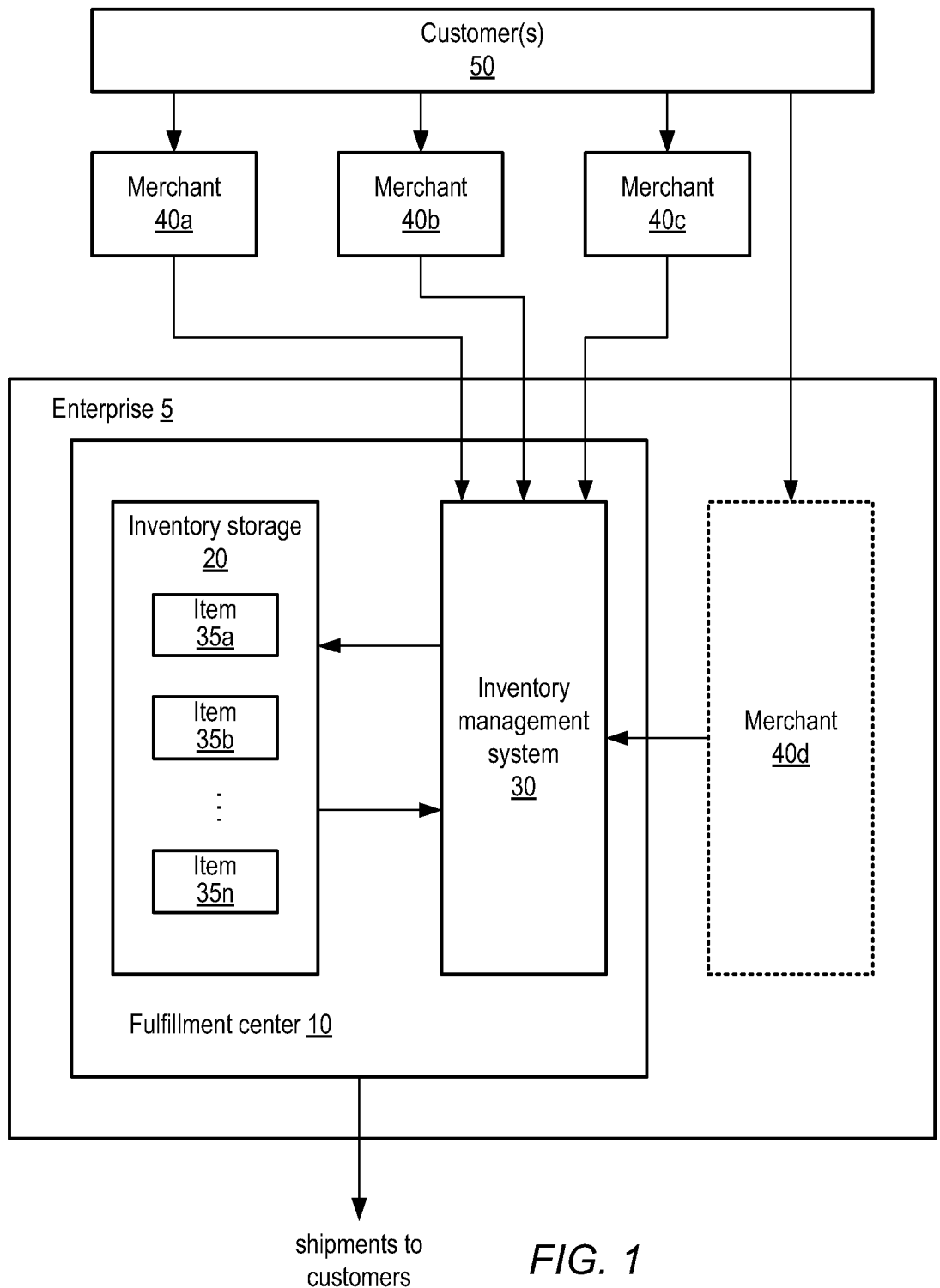
FIG. 1 is a block diagram illustrating one embodiment of a fulfillment center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Fulfillment Center Overview

One embodiment of a fulfillment center configured to store inventory items for customer order fulfillment is illustrated in FIG. 1. In the illustrated embodiment, an enterprise 5 includes a fulfillment center 10 that in turn includes an inventory storage facility 20 as well as an inventory management system 30. Storage facility 20 may be configured to store an arbitrary number of inventory items 35a-n. As described in greater detail below, system 30 may be configured to receive customer orders for various ones of items 35 from one or more customers 50 via one or more of an arbitrary number of different merchants 40a-d. Additionally, system 30 may be configured to initiate and/or coordinate actions resulting in the shipment of ordered items 35 to corresponding customers 50.

Generally speaking, fulfillment center 10 may be configured to receive and store different kinds of items 35 from various sources, such as wholesalers, distributors, or merchants 40, for example. Items 35 may generally encompass any type of tangible object or substance that may be received for storage. For example and without limitation, items 35 may include media items (e.g., books, compact discs, videotape and/or DVDs), electronic devices, computers and related peripherals and equipment, consumer or commercial appliances, clothing, prescription and/or over-the-counter pharmaceuticals, cosmetics, food, or other suitable items. It is noted that items 35 may be stocked, managed or dispensed in terms of discrete, countable units or multiples of units, such as packages, cartons, crates, pallets or other suitable aggregations. Alternatively, some items 35 such as bulk products, commodities, etc. may be stored in continuous or arbitrarily divisible amounts that may not be inherently organized into countable units. Such items 35 may be managed in terms of measurable quantities such as units of length, area, volume, weight, time duration or other dimensional properties characterized by units of measurement. Generally speaking, a quantity of an item 35 may refer to either a countable number of individual or aggregate units of an item 35 or a measurable amount of an item 35, as appropriate.

Items 35 received at fulfillment center 10 for storage may be stored within inventory storage facility 20, which may include any suitable combination or arrangement of item storage structures. For example, facility 20 may include racks, bins, pallets or other types of storage apparatus arranged in a grid or other fashion. In some embodiments, facility 20 may include different types of storage suitable for items 35 having special storage requirements. For example, certain types of items 35 may be perishable, fragile or volatile and may require storage under controlled temperature, atmospheric or other conditions. Correspondingly, facility 20 may include refrigerated or other types of storage areas configured to satisfy special environmental requirements of certain items 35. It is contemplated that in some embodiments, items 35 may be stored within facility 20 in different configurations than in which they are received. For example, units of items 35 may be received in boxes, on pallets, or in other aggregate units, and may be unpacked or otherwise disaggregated for storage as individual units within bins, on shelves, or in other storage structures within facility 20.

Inventory management system 30 may generally be configured to track and control the status and movement of inventory items 35 through fulfillment center 10. In one embodiment, as described in greater detail below in conjunction with the description of FIG. 8, system 30 may include computer-accessible media configured to store instructions that are executable, e.g. by a processor or computer system, to detect events that relate to items 35 and to generate or initiate actions in response to such events. For example, system 30 may detect events relating to the arrival of inventory items 35 from a supplier or merchant, and may responsively instruct an agent (e.g., a mechanical agent or human agent) to process the received items 35 and store them appropriately within storage facility 20. Similarly, system 30 may be configured to detect orders for various items 35 that may arrive from merchants 40 on behalf of customers 50. Responsively, system 30 may be configured to instruct an agent to select the appropriate item(s) 35 for a received order from storage facility 20 and prepare the selected item(s) 35 for shipping or other conveyance to a corresponding customer 50. In some embodiments, whenever units of a given item 35 are stored within or selected from storage facility 20, system 30 may update an indication corresponding to the given item 35 to reflect its inventory status. For example, such an indication may reflect the number of units currently stored within facility 20, the number of units that have been selected from facility 20 but that have not yet left fulfillment center 10, the number of units of given item 35 that are on order, and/or any other suitable item status information. System 30 may also be configured to process events relating to the processing of damaged or defective items 35, returns received from customers 50, or other exceptional events.

Merchants 40 may arrange to offer various ones of items 35 in commerce to customers 50. Generally speaking, an item 35 may be offered in commerce by a merchant according to any suitable business model. For example, an item 35 may be offered in commerce on the basis of a sale, rental, lease, auction, barter, credit, licensing, royalty or any other type of transaction. Merchants 40 may offer items 35 in commerce through any of a variety of channels. For example, a given merchant 40 may present offers of items 35 via electronic commerce (e-commerce) portals accessible by customers 50. Such e-commerce offerings may variously include listing items 35 via a web-based entity (e.g., a web site or page) hosted by the given merchant 40 and presented as an offering entity distinct from enterprise 5, or listing items 35 via a web-based entity hosted by enterprise 5 on behalf of the given merchant 40.

In some embodiments, a merchant 40 may list items 35 via a general web-based entity hosted by enterprise 5, such as a marketplace or forum in which many merchants 40 may list offerings. Generally speaking, a marketplace e-commerce channel may generally refer to a web-based entity through which multiple merchants 40 may offer items 35 to customers 50 via one or more web pages. For example, a marketplace may be organized to present to customers 50 one or more web pages listing the various merchants 40 offering a particular item 35 in commerce according to various terms (e.g., price, availability, condition, etc.). Alternatively, a marketplace may be organized to present to customers 50 one or more web pages corresponding to respective virtual storefronts of merchants 40, where each storefront indicates the various offerings of a corresponding merchant 40. In some embodiments, a marketplace may be implemented via a web services application programming interface (API), described below, rather than as one or more web pages. For example, catalog information, ordering functions and other aspects of a marketplace may be implemented as web services functions that may be invoked by various parties to present items 35 in commerce to customers 50. Other configurations of e-commerce marketplaces are possible and contemplated.

A merchant's e-commerce offerings may also include listing items 35 via a third-party web entity distinct from enterprise 5 and the merchant 40, such as a third-party auction web entity. It is also contemplated that a merchant 40 may present e-commerce offerings through entities other than web-based entities. For example, a merchant 40 may present such offerings through electronic mail, electronic bulletin boards, or other electronic channels.

In some embodiments, merchants 40 may also offer items 35 in commerce to customers 50 through non-electronic channels, such as catalog, telephone or physical storefront channels, for example. Alternatively, some merchants 40 may offer items 35 in commerce through a combination of different channels. It is also noted that some merchants, such as merchant 40d, may be affiliated with the enterprise 5 that provides fulfillment services to merchants 40 in general, although in other embodiments, enterprise 5 may provide fulfillment services for items 35 without operating as a merchant for those items.

Generally speaking, customer(s) 50 may include any entity that may place an order for one or more items 35 via one or more merchants 40. For example, a customer 50 may include an individual, institution, corporation, business, organization or other entity. Customers 50 may place orders with merchants 40 via any suitable channel, such as one of the e-commerce channels described above, or via a non-electronic order channel. A customer 50 may be an entity that is ultimately legally and/or fiscally responsible for an order, but need not be such an entity. Similarly, a customer 50 may or may not be the intended recipient of items associated with a given order. For example, a customer 50 may place an order for items 35 on behalf of another entity that may bear liability for payment or may be the intended recipient. In some embodiments, a customer 50 may include multiple individuals or entities that consent to have their ordered items 35 shipped together. For example, a customer 50 may correspond to a group of individuals in the same household or business.

After a given customer 50 places an order for one or more items 35, the order may be fulfilled. Generally speaking, the fulfillment process may include selecting from storage the item(s) 35 specified in the order, packaging selected item(s) 35 appropriately for the mode in which they will be conveyed to the customer 50 or other intended recipient, and conveying the package or packages to the recipient. For example, selected item(s) may be packaged in one or more boxes, envelopes or other types of containers along with protective material, promotional materials (e.g., advertising leaflets or brochures), a packing slip or invoice. The packing container may then be sealed, appropriately labeled, and tendered to a common carrier (e.g., the United States Postal Service or another carrier) or another type of carrier or delivery service for delivery to the intended recipient.

Fulfillment Services Request Processing

As shown in the embodiment of FIG. 1, fulfillment center 10 may be configured to offer fulfillment services to a variety of merchants 40 that may be internal or external to the enterprise associated with fulfillment center 10. In general, fulfillment services may include any actions relating to the storage and processing of items 35 within fulfillment center 10 as well as the fulfillment of specific customer orders for various ones of items 35. For example, fulfillment services may include those tasks involved in receiving items 35 into inventory, such as taking physical receipt of units or quantities of items 35, examining and/or evaluating the condition of received items 35, unpacking or repackaging items 35 if necessary, and storing items 35 within storage facility 20. Fulfillment services may also include selecting or picking items 35 from storage facility 20 in response to a customer order, as well as the packaging and shipping tasks described above. In some embodiments, fulfillment services may include other tasks undertaken on behalf of a merchant 40, such as inspecting or monitoring the quantity and/or condition of items 35 while stored in storage facility 20, receiving and processing items 35 returned from customers 50, processing and disposing of items 35 that are unmarketable for various reasons (e.g., items 35 that are surplus, damaged, expired, spoiled, etc.), engaging in customer service activities (e.g., responding to complaints, inquiries, etc.) with customers 50, or other types of tasks. Embodiments of fulfillment center 10 configured to provide fulfillment services to merchants 40 may also be referred to as fulfillment services providers.

In some instances, fulfillment center 10 may provide fulfillment services to merchants 40 with greater economies of scale than if merchants 40 were to perform their own fulfillment services. For example, the incremental cost of providing a square foot of storage area in a large fulfillment center 10 (e.g., one comprising hundreds of thousands of square feet of storage area) may be significantly lower than the cost incurred by a small merchant 40, which may have limited space for storage or may be forced by local market conditions to retain more space than required for that merchant's inventory. Similarly, fulfillment center 10 may implement sophisticated inventory tracking and management techniques that might be costly and cumbersome to implement on the scale of an individual merchant 40, such as RFID (Radio Frequency Identification) of items, dynamic scheduling and optimization of item selection across multiple orders, real-time inventory tracking with respect to order, receiving and shipping activity, or other inventory management techniques. As described in greater detail below, in some embodiments fulfillment center 10 may be configured to consolidate a single customer's orders from several merchants 40, which may realize additional economies of scale, e.g., by reducing packaging, item handling and shipping costs.

Arranging the provision of fulfillment services to various merchants 40 may present challenges, however. For example, merchants 40 may operate as distinct enterprises having methods and systems for inventory management and accounting that differ from one another as well as from enterprise 5. As a result, merchants 40 and enterprise 5 may lack a uniform way of identifying inventory items 35. For example, a given merchant 40 may identify and manage a particular item 35 by that item's Universal Product Code (UPC), whereas the same item 35 may be identified within fulfillment center 10 by a proprietary unique identification number. Further, merchants 40 may wish to dynamically change the fulfillment services they receive for various items 35. For example, a particular merchant 40 may wish to expeditiously transition from performing its own fulfillment for an item 35 to receiving fulfillment services for that item from fulfillment center 10, or vice versa. If such a transition were to require manual approvals (e.g., of the merchant's eligibility or the item's suitability for fulfillment services) and/or a manual integration of relevant aspects of the particular merchant's inventory and order management systems with those of fulfillment center 10, the overhead of arranging for fulfillment services may significantly erode the savings or efficiencies provided by such services. For example, if enterprise 5 were condition processing of fulfillment services requests on manual lookup and entry of data provided by a merchant 40, days or weeks might elapse In one embodiment, fulfillment center 10 may be configured to provide a registration interface through which a merchant may register to receive fulfillment services for one or more items 35, where operation of the registration interface to process a request for fulfillment services does not require human intervention. For example, the interface may provide an automated process through which a merchant may complete those tasks necessary to initiate fulfillment services for various items 35. As described in greater detail below, in various embodiments such an automated process may include evaluating the credentials of a merchant 40 (e.g., whether the merchant is known to enterprise 5, in good financial status, etc.), assessing the items 35 for which fulfillment services have been requested (e.g., whether the items 35 qualify for the requested services), and providing the requesting merchant 40 with the information needed to complete the fulfillment services request (e.g., providing labels to be applied to items 35 for fulfillment center inventory control, shipping labels for shipping items to a fulfillment center 10, instructions, status reports, or other information). The fulfillment center's portion of each of these tasks may be performed automatically and without human intervention, as detailed below.

Figure 2A:
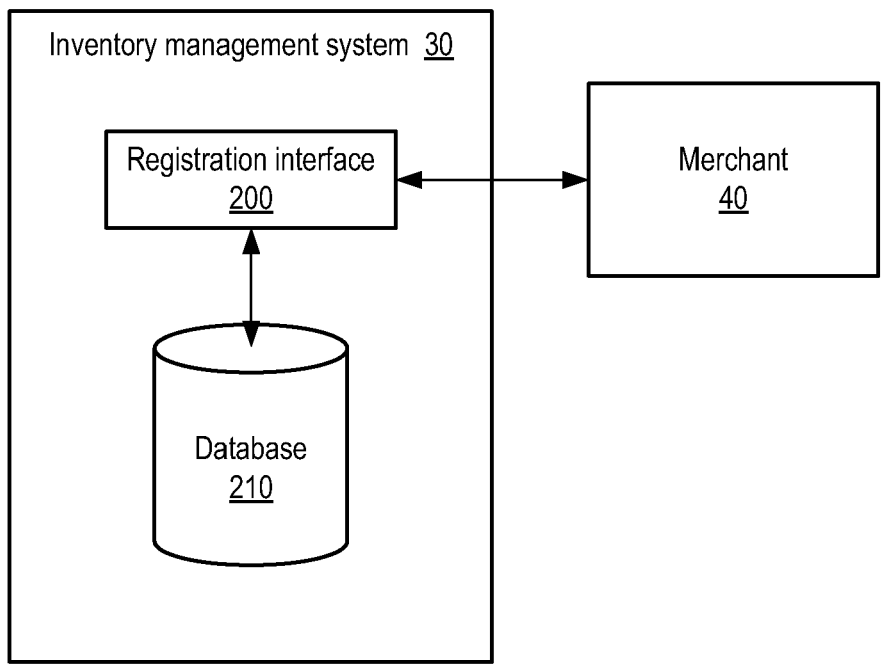
FIG. 2A is a block diagram illustrating one embodiment of a fulfillment services registration interface.

One embodiment of a fulfillment services registration interface is illustrated in FIG. 2A. In the illustrated embodiment, inventory management system 30 of fulfillment center 10 is shown to include a registration interface 200 configured to interact with a database 210. In one embodiment, registration interface 200 may be configured to present an interface through which a given merchant 40 may specify a request for fulfillment services, enter data related to the requested services, and engage in those processing actions deemed necessary by enterprise 5 for given merchant 40 to receive the requested services. For example, in one embodiment interface 200 may be configured to present to a merchant 40 one or more web pages accessible via the public Internet or a private intranet (e.g., a private network maintained by or on behalf of enterprise 5 requiring some level of authentication or secured connection for access). Such a web page may include fillable forms, menus, executable applications (e.g., applications coded in Java™, Javascript or another language suitable for web-based execution) or other web-based interface elements.

In another embodiment, interface 200 may be configured to present a proprietary or non-web-based registration interface to merchants 40. For example, interface 200 may be accessible through a dialup or non-web-based Internet connection, such as via a terminal emulation program such as telnet, or via another type of standard or proprietary application suitable for transmitting information between a merchant 40 and inventory management system 30. In yet another embodiment, interface 200 may include a web services interface for merchant fulfillment services registration, as described in greater detail below. In some embodiments, interface 200 may include other types or modes of interface implementations, including various combinations of the aforementioned techniques, configured for communicating with merchants 40 to perform activities related to registering for or managing use of fulfillment services.

In the illustrated embodiment, interface 200 may be configured to store fulfillment services registration data received from merchants 40, or other data that is derived from or produced as a result of or in relation to a merchant's fulfillment services registration activity, within database 210. Generally speaking, database 210 may include any suitable type of application or data structure that may be configured as a persistent data repository. For example, database 210 may be configured as a relational database that includes one or more tables of columns and rows and that may be searched or queried according to a query language, such as a version of Structured Query Language (SQL). Alternatively, database 210 may be configured as a structured data store that includes data records formatted according to a markup language, such as a version of eXtensible Markup Language (XML). In other embodiments, database 210 may be implemented using one or more arbitrarily or minimally structured data files managed and accessible through any suitable type of application.

Database 210 may generally be configured to store any kind of data related to merchants 40, items 35, and/or requests for fulfillment services in various stages of processing. For example, database 210 may be configured to store identifying information about merchants 40, such as names and address of merchant personnel or departments, merchant billing and shipping address information, merchant banking or other financial information, or other identifying information. Database 210 may also be configured to store current and/or historical status information regarding inventory or sales transactions of merchants 40, such as a merchant's order history, payment history, the status of a merchant's inventory items 35 within fulfillment center 10, the status of any pending fulfillment services requests for a merchant, or other types of status information. In some embodiments, database 210 may also be configured to store identifier mapping information for items 35. For example, database 210 may store records that relate a given merchant 40's identifier for a particular item 35 (e.g., a merchant's stock keeping unit (SKU) identifier) with an identifier that may be specific to enterprise 5 or to fulfillment center 10. Such mapping information may be used, for example, to associate a merchant's fulfillment services request. In some embodiments, database 210 may include information regarding items eligible for and/or registered for export services, as described in more detail below.

It is noted that database 210 need not be integrated within inventory management system 30, or even within fulfillment center 10. In some embodiments, merchant and/or inventory data may be stored in a number of different data stores distributed throughout enterprise 5. For example, merchant financial data may be stored in an accounting database associated with an accounting department of enterprise 5 that may be distinct from a fulfillment department such as fulfillment center 10. Similarly, in some embodiments interface 200 may be configured to interact with a variety of systems, applications or databases within or external to inventory management system 30 in addition to or instead of database 210.

Figure 3:
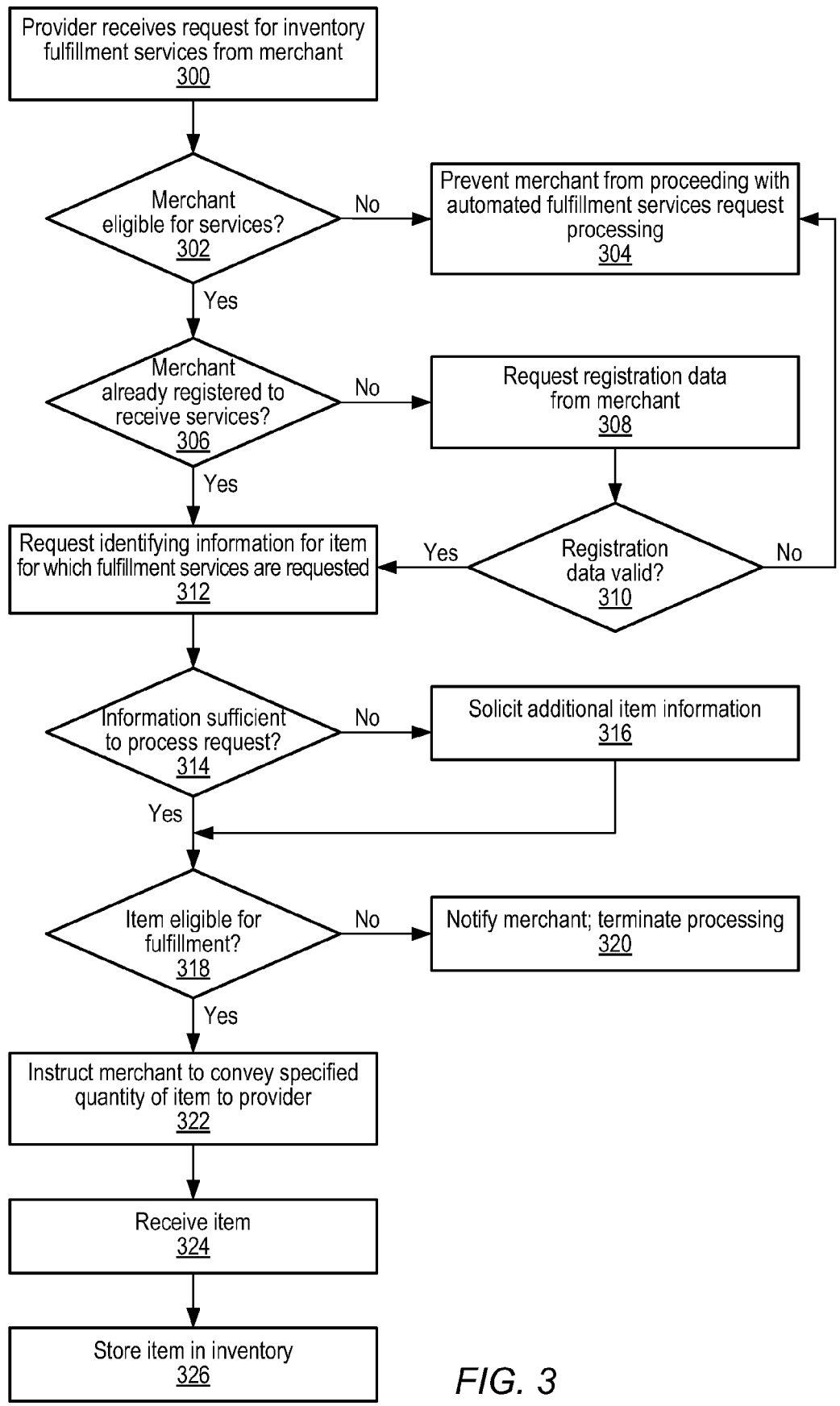
FIG. 3 is a flow diagram illustrating one embodiment of a method through which a fulfillment services provider may receive and process a request for inventory fulfillment services from a merchant.

One embodiment of a method through which a fulfillment services provider (or simply, provider) such as fulfillment center 10 may receive and process a request for inventory fulfillment services from a merchant 40 is illustrated in FIG. 3. It is contemplated that in various embodiments, the illustrated method or a suitable variant thereof may be implemented via computer-executed instructions stored on a computer-accessible medium, as described in greater detail below in conjunction with the description of FIG. 9, or via dedicated computing hardware devices that may be state-dependent (e.g., state machines) but which may not execute discrete instructions per se. It is further contemplated that in some embodiments, some or all of the illustrated method may be implemented by decision logic included within interface 200, while in other embodiments interface 200 may be configured to relay merchant state information (e.g., inputs or outputs of the fulfillment services registration process) to and from other executable components, systems or devices within inventory management system 30 or fulfillment center 10. In such other embodiments, some or all of the illustrated method may be implemented by components other than interface 200. It is noted that in various embodiments, a merchant may submit a single fulfillment services request applicable to multiple different items 35, or may submit respective requests for each of several items 35. Although examples discussed hereinafter may refer to processing of a single item 35, it is understood that the method may be applicable to the concurrent fulfillment services request processing of multiple different items 35.

In the illustrated embodiment, operation begins in block 300 where a request for inventory fulfillment services is received by a fulfillment services provider from a merchant 40. For example, such a request may be received via one embodiment of registration interface 200 as a result of a merchant 40 signing into a secure web page using a merchant identifier and an appropriate credential (e.g., a login name and password, or any other suitable type of credential), and subsequently selecting an option to request fulfillment services (e.g., a link, button, etc.) displayed via the secure web page. In other embodiments, such a request may be received via web services calls or via a mode of communication that does not employ web-based protocols.

Upon receiving a fulfillment services request from a merchant 40, the provider may determine whether the requesting merchant is eligible to receive fulfillment services (block 302). In some embodiments, merchant eligibility for fulfillment services may depend on the merchant's historical behavior. For example, the current status or history of the merchant's prior transactions with the provider or another enterprise may be examined to determine whether the merchant has engaged in fraudulent or questionable transactions with customers, vendors, the provider, or other parties. In some embodiments, a merchant's creditworthiness, customer service history, or any other data related to the merchant (or, in some cases, related to fiscally responsible entities or individuals associated with the merchant, such as guarantors, principals, executives, etc.) may be taken into account when considering a merchant's eligibility for fulfillment services, and such data may include data obtained from third parties such as credit reporting agencies, business references, customers and the like.

In various embodiments, the provider may implement decision models of varying complexity taking into account any of the foregoing types of merchant data or other types not specifically mentioned in order to render a decision as to whether the requesting merchant is eligible for fulfillment services. For example, in one embodiment any history of fraudulent behavior may disqualify a merchant, whereas in other embodiments a more sophisticated risk analysis model may consider such behavior in the context of other data points. It is contemplated that in some embodiments, eligibility for fulfillment services may depend on the type or volume of services requested. For example, a merchant 40 having little history or questionable history may be allowed access to fulfillment services on a trial or probationary basis, with such access restricted to certain types, quantities, or value of items 35, or restricted on some other basis.

If the requesting merchant 40 is determined to be ineligible for fulfillment services, the merchant may be prevented from proceeding with automated fulfillment services request processing (block 304). In some embodiments, the merchant may be directed to contact a fulfillment services agent (e.g., a customer service representative) for further information or assistance in processing the fulfillment services request, for example to receive an explanation of the reasons for disqualification and of actions that may be taken (if any) to remedy the situation.

If the requesting merchant 40 is determined to be eligible for fulfillment services, the provider may determine whether the merchant is already registered to receive fulfillment services (block 306). In one embodiment, determining a merchant's registration status may include determining whether the merchant has supplied data that the provider deems necessary to perform fulfillment services on behalf of the merchant. For example, registration may be contingent upon a merchant 40 agreeing (e.g., electronically or in writing) to a fulfillment services participation agreement that details obligations and expectations of the provider and the merchant relating to fulfillment services (such as the merchant's agreeing to abide by various financial, procedural, customer service or other policies). Registration may also be contingent upon a merchant 40 providing sufficient identifying information, as set forth below. In some embodiments, determining whether a merchant is registered may include determining whether the merchant has previously registered for fulfillment services, and if so, assuming that the merchant is registered without checking each data item required of the merchant for registration. Also, in some embodiments, if the previous registration or any previous fulfillment services activity on behalf of the merchant occurred more than a threshold period of time prior to the current fulfillment services request, the merchant may be required to provide some or all of the registration data once again. It is noted that in some embodiments, determination of a merchant's registration status may occur prior to determination of the merchant's eligibility for fulfillment services.

If the requesting merchant 40 is determined not to be registered, the provider may request registration data from the merchant 40 (block 308). For example, a fillable web form or other request for merchant input may be provided or displayed to the merchant 40 via interface 200. Requested input may include information such as the merchant's name, phone number, address, bank name, bank routing number and account number, taxpayer identification information, and/or any other suitable information. Additionally, if necessary or appropriate, a participation agreement may be conveyed to the merchant 40 via interface 200, along with a solicitation for the merchant to expressly accept or refuse the agreement. The merchant 40 may then enter or supply the requested data in a manner suitable to the mode in which the request was delivered, e.g., by filling out a web-based form.

The provider may then attempt to validate the registration data provided by the merchant 40 (block 310). For example, the provider may check to see that all required data has been provided, and may corroborate certain data items with third parties, e.g., by checking contact or banking information against a public address database or the specified bank, respectively. The provider may also check to see whether the merchant indicated acceptance of the participation agreement, if applicable. If any portion of the provided data fails to validate, the merchant may request that the merchant reenter the data, or may terminate automated fulfillment services request processing and request that the merchant contact an agent for further assistance (block 304).

If the provided data is valid or the merchant 40 is determined to have already registered, the provider may request identifying information associated with the item(s) 35 for which the merchant 40 is requesting fulfillment services (block 312). For example, interface 200 may display another web-based form through which the merchant may provide item-identifying information. In some embodiments, item-identifying information may be supplied along with the initial request for fulfillment services, and a separate request for this information may not be made by the provider. Also, in some embodiments, a merchant 40 may specify a quantity of the item 35 for which fulfillment services are requested in addition to item identifying information.

The provider may then determine whether it has sufficient information about the item 35, as identified by the requesting merchant 40, to process the fulfillment services request for that item (block 314). In one embodiment, the provider may make this determination by first determining whether the item 35 is known to the provider (e.g., whether the provider has some record of information associated with the item 35). For example, as noted previously, an item 35 may be identified by a merchant 40 in a different manner than by fulfillment center 10. In one embodiment, the merchant may provide the merchant's own unique identifier, such as a merchant-specified SKU identifier, as identifying information for an item 35. In response, the provider may determine whether there exists a mapping from the merchant's unique identifier to an identifier known to the provider, for example, by querying database 210 using the merchant's identifier to determine whether a corresponding record includes the provider's identifier. In another embodiment, when supplying identifying information for an item 35, the requesting merchant 40 may provide an identifier known to the provider instead of or in addition to a merchant-specified identifier.

If the provider has insufficient information to process the fulfillment services request for the identified item 35, the provider may solicit additional information from the merchant (block 316). For example, if the provider could not locate a record for item 35 on the basis of a merchant-specific identifier such as a merchant's SKU, the provider may solicit the requesting merchant 40 for a provider-specific identifier, or a generic identifier such as a Universal Product Code identifier, if available. In some embodiments, the provider may provide item search capabilities via interface 200 in order to allow a requesting merchant 40 to determine whether the item 35 for which fulfillment services have been requested is known to the provider. For example, the provider may provide a keyword search feature to allow the requesting merchant 40 to enter keywords relevant to an item 35. Alternatively, the provider may allow the requesting merchant 40 to navigate a hierarchy of item categories to ascertain whether the item 35 identified by the merchant 40 is included in the hierarchy, and in some embodiments, to determine the most similar item in the hierarchy if the item 35 is not included.

In some circumstances, the provider may have no information corresponding to an item 35 for which fulfillment services have been requested. For example, the provider may never have provided fulfillment services for the item 35 before, either for the requesting merchant 40 or any other merchant. In some embodiments, the provider may be configured to request the necessary information in this case. For example, the provider may request that the requesting merchant 40 provide information such as item dimensions, weight, item type or class information (e.g., according to a taxonomy or hierarchy defined by the provider), item special characteristics (e.g., whether the item is liquid, perishable, a hazardous material, requires special handling or storage conditions, etc.) or any other information deemed necessary by the provider to identify the item 35, to determine whether the item 35 is eligible for fulfillment services, and/or to facilitate the provision of fulfillment services.

Once the provider has sufficient information about the identified item 35, the provider may determine whether the item 35 is eligible for the requested fulfillment services (block 318). For example, in one embodiment, the provider may disallow fulfillment services for certain types of items 35, such as hazardous items. In another embodiment, a merchant 40 may be restricted from requesting fulfillment services for certain items 35 according to its participation agreement or fee structure, current business relationship with the provider, the current state of the merchant's other inventory with respect to the provider, or any other suitable criterion. For example, a merchant 40 may contract with a provider to receive fulfillment services for a certain quantity of an item 35 over a given period of time, such that fulfillment requests for additional quantities of that item 35 may be disallowed.

If the fulfillment services request cannot be processed owing to ineligibility of the item 35, the provider may notify the requesting merchant 40 via interface 200, and automated fulfillment services request processing may terminate (block 320). Otherwise, the provider may instruct the requesting merchant 40 to convey some specified quantity of item 35 to the provider, such as a quantity that may have been specified by the requesting merchant in or subsequent to the request for fulfillment services (block 322).

In one embodiment, in instructing the merchant to convey item 35, the provider may provide the requesting merchant 40 with data to be used by the merchant to identify individual units of item 35. For example, the provider may convey a document file to the merchant via interface 200, such as a Portable Document Format (PDF) file or another type of document file, which includes alphanumeric, bar code or other information indicative of identifying information that may be used to manage units of the item 35 within fulfillment center 10. In various embodiments, such identifying information may uniquely identify each individual unit of the item 35, may generically identify the units as being identical instances of the kind or type of item 35, or may combine information generic to the item 35 with information specific to a particular unit of the item 35. For example, the provided identifying information may include a serial number that is unique to a particular unit of an item 35, a UPC or similar product code that is generic to all units of an item 35, or a code that identifies the product type of item 35 as well as the condition of a particular unit (e.g., new, used, damaged, etc.). Any suitable type or combination of identifying information may be employed. The provided document may be used to generate labels to be respectively affixed to individual units of item 35. For example, the requesting merchant 40 may, upon receiving the document, print its contents on label stock and affix the labels to units of item 35 as appropriate.

The provider may also provide the requesting merchant 40 with data to be used by the merchant to convey item 35 to the provider. In one embodiment, the provider may convey a document file, such as a PDF document or other type of document file, to the merchant via interface 200 that includes data indicative of shipping information. For example, the document file may include address information, bar code data and/or other data that may be used to generate a shipping label. Such a shipping label may be a generic shipping label suitable for tendering a package to any type of carrier. Alternatively, the shipping label data may be tailored to a particular carrier, for example by including bar code, geographic code, or other routing or handling information specific to the particular carrier. In some embodiments, shipping information data may be included in the same document used to convey unit identifying information as described above, while in other embodiments shipping information data may be conveyed in a separate document. It is noted that in various embodiments, the provider may convey unit-identifying information, shipping information, both or neither to the requesting merchant 40.

In some embodiments, shipping-related data provided to the requesting merchant 40 may reflect the number of discrete shipments or packages expected from the requesting merchant 40. For example, the merchant may indicate that the specified quantity of item 35 for which fulfillment services have been requested may be divided among a certain number of packages. Alternatively, the provider may instruct the requesting merchant 40 to divide the specified quantity among shipments in a particular way. In some embodiments, the shipping data provided to the requesting merchant 40 in the case of multiple shipments or packages of a particular item 35 may uniquely identify each shipment or package, for example by including bar code or other information to be included on shipping labels generated from the shipping data. It is contemplated that in some embodiments, the provider may instruct the requesting merchant 40 to ship different quantities of item 35 to different fulfillment centers 10, and shipping data conveyed to the requesting merchant 40 may reflect this distribution. For example, the provider may specify the distribution according to available storage resources at various fulfillment centers 10. Alternatively, the provider or the requesting merchant 40 may wish to ensure a particular geographical distribution of item 35 among different fulfillment centers 10, for example to satisfy expected patterns of demand.

In many cases, upon receiving instructions to convey the specified quantity of item 35 to the provider, the requesting merchant 40 may appropriately package and ship item 35 to the provider according to the received instructions. For example, the requesting merchant 40 may print item labels and affix them to units of item 35, pack the units in one or more packages for shipment, print shipping labels and affix them to the package(s), and tender the package(s) to a shipper or carrier for shipment to the provider. However, the requesting merchant 40 need not be in actual possession of item 35. In some embodiments, the requesting merchant 40 may arrange with a third party, such as a manufacturer, distributor, vendor, or other type of supplier, to convey the specified quantity of item 35 to the provider. For example, the requesting merchant 40 may forward item identifying and/or shipping information to the third party, which may arrange to convey item 35 to the provider on behalf of the requesting merchant 40.

Subsequent to instructing the requesting merchant 40 to convey the specified quantity of item 35, the provider may receive item 35 (block 324) and store item 35 into inventory (block 326). For example, one or more packages including units of item 35 may arrive at fulfillment center 10. In various embodiments, the package(s) may be scanned, unpacked, inspected, and/or otherwise processed, and units of item 35 may be stored within storage facility 20. Inventory management system 30 may also be appropriately updated to reflect the status of received units of item 35, and in some embodiments the requesting merchant 40 may be notified that item 35 is available for fulfillment.

In some embodiments, the provider may receive a notification of shipment from the requesting merchant 40 before item 35 arrives. In some such embodiments, either the provider or the requesting merchant 40 may update an indication of availability of item 35 in response to such a notification. For example, the requesting merchant 40 may offer item 35 in commerce via an e-commerce channel maintained by enterprise 5, such as a web-based storefront or a marketplace. In response to a notification of shipment received from the requesting merchant 40, enterprise 5 may update an offering display or listing of item 35 to indicate an expected lead time or other indication of availability, taking into account factors such as expected time in transit from the requesting merchant 40 to the provider, processing time to receive and store item 35 at the provider, and/or other factors affecting availability of item 35.

It is noted that in some embodiments, a fulfillment services provider such as fulfillment center 10 may operate to allow a merchant 40 to request fulfillment services for an item 35, to conduct those actions necessary to validate the eligibility of the merchant and the item for the requested services, and to convey to the merchant the data necessary for the merchant to prepare item 35 for the requested services and convey item 35 to the provider. In particular, it is noted that fulfillment center 10 may perform these tasks in an entirely automated manner, such that if the requesting merchant 40 and the item 35 satisfy the provider's eligibility requirements, the fulfillment services request may be processed without human intervention. For example, by interacting with fulfillment center 10 via registration interface 200, a merchant 40 may complete a fulfillment services request for an item 35, ship item 35 to fulfillment center 10, and begin relaying customer orders for item 35 to fulfillment center 10 for fulfillment as detailed below, without depending on the actions of an agent of fulfillment center 10 external to registration interface 200. Such an automated fulfillment services request processing system may also be referred to as a "self-service" system, in that a merchant 40 may interact with the system entirely on its own initiative.

Figure 2B:
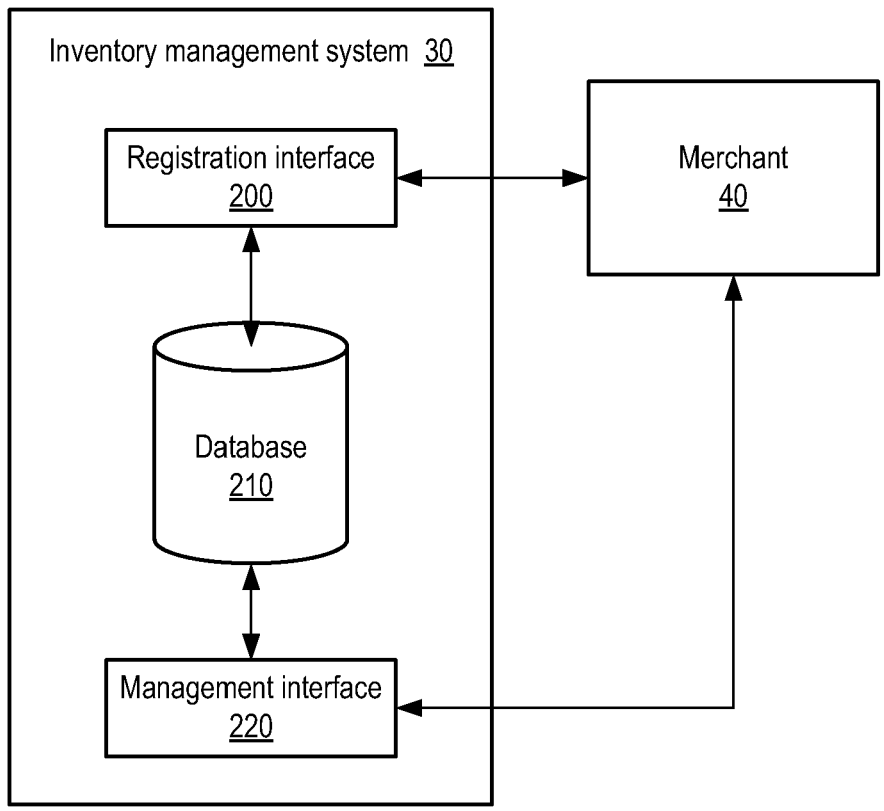
FIG. 2B is a block diagram illustrating one embodiment of a fulfillment services management interface.

In one embodiment, in addition to providing a self-service registration interface 200 through which merchants 40 may request inventory fulfillment services for various items 35, a fulfillment services provider may provide a management interface through which merchants 40 may manage various aspects of the fulfillment services applicable to their items 35. FIG. 2B illustrates an embodiment of inventory management system 30 similar to that of FIG. 2A, with the addition of a management interface 220 that may be configured to interact with database 210 as well as merchant 40.

Management interface 220 may be configured to present an interface through which a given merchant 40 may perform any of a variety of functions, described below, with respect to items 35 for which the given merchant may have previously requested fulfillment services (e.g., via registration interface 200). Like registration interface 200, in one embodiment management interface 220 may be configured to present to a merchant 40 one or more web pages accessible via the public Internet or a private intranet (e.g., a private network maintained by or on behalf of enterprise 5 requiring some level of authentication or secured connection for access). Such a web page may include fillable forms, menus, executable applications (e.g., applications coded in Java™, Javascript or another language suitable for web-based execution) or other web-based interface elements. In other embodiments, management interface 220 may be configured to present a non-web-based management interface or a web services-based management interface to merchants 40, in a manner similar to that described above with respect to registration interface 200.

In some embodiments, it is contemplated that both registration interface 200 and management interface 220 may be implemented as distinct or integrated portions of a web-based fulfillment services portal. For example, functionality associated with both registration interface 200 and management interface 220 may be implemented via respective web pages or groups of web pages presented to merchants 40 as aspects of a centralized fulfillment services website. Alternatively, such functionality may be presented through respective sets of web services calls presented to merchants 40 as a general web services API for registration for and management of fulfillment services.

As described above, in one embodiment, after a merchant 40 has registered an item 35 for fulfillment services, the item 35 may be placed under the physical custody and management of fulfillment center 10. In such an embodiment, the supply chain for items 35 may be extended to encompass items 35 in transit from the merchant 40 to fulfillment center 10 and from fulfillment center 10 to customers 50 in addition to the status of items 35 within fulfillment center 10. (In some cases, the general supply chain for an item 35 may also account for the reverse supply chain reflecting the flow of returned units from customers 50 and/or units removed from fulfillment center 10 and conveyed back to a merchant 40). In some embodiments, management interface 220 may be configured to provide a given merchant 40 with visibility into the status of the general supply chain with respect to its registered items 35. For example, management interface 220 may provide an indication or display of the quantity of units of a given item 35 that are in transit between given merchant 40, fulfillment center 10 and/or customers 50 at any given time (e.g., including tracking information for units in transit, if available or applicable).

In one embodiment, management interface 220 may also provide an indication of the status of units of given item 35 held in inventory within fulfillment center 10, such as identifying units committed to orders but not yet picked or shipped, identifying units that are spoiled or damaged, or identifying any other relevant inventory status information. In some embodiments, management interface 220 may provide to a merchant 40 explanatory information regarding problems or exceptions that arise in the supply chain for an item 35. For example, if units of an item 35 were damaged upon arrival at fulfillment center 10 from merchant 40, or were otherwise in a state or condition different from that expected from or indicated by merchant 40 when fulfillment services were requested for the units (e.g., used rather than new condition), management interface 220 may be configured to display such information to merchant 40 and allow the merchant 40 to specify an action to resolve the problem. For example, management interface 220 may allow the merchant 40 to instruct that damaged items be disposed of or returned to the merchant 40, to allow the merchant 40 to arrange to convey additional units to fulfillment center 10 (e.g., to cover outstanding orders), or to take another suitable action. More generally, management interface 220 may allow merchant 40 to request, on its own initiative, that units of an item 35 be withdrawn from inventory (e.g., for return to merchant 40), repositioned among different fulfillment centers 10, or disposed of.

Generally speaking, management interface 220 may be configured to provide any type of function suitable for monitoring or altering the status of a given item 35 within the extended supply chain encompassing a merchant 40, fulfillment center 10 and customers 50. In some embodiments, the supply chain and management interface functionality may be extended to other third parties such as manufacturers, distributors, wholesalers, or other parties that may be involved in transactions pertaining to given item 35.

In other embodiments, management interface 220 may be configured to provide functions that may not be directly related to supply chain monitoring or management. In one embodiment, management interface 220 may be configured to provide an interface through which a merchant 40 may receive notice of customer service issues raised on behalf of customers 50 and to participate in their resolution. For example, inventory management system 30 may be configured to receive reports of customer service issues raised with respect to particular orders and to identify the merchant(s) 40 associated with those orders (or specific items 35 included in the orders). System 30 may then direct such customer service reports associated with a given merchant 40 to an inbox, forum or other repository accessible by the given merchant 40 via management interface 220. Alternatively, management interface 220 may forward such reports directly to the given merchant 40, for example via email. In response to a given report, the given merchant 40 may participate in resolving the issue via management interface 220, for example by arranging for an item 35 to be returned or replaced, arranging for a refund or credit to be issued to a customer 50, or indicating another suitable action.

Export Services Registration

Another service that may in some embodiments be provided by a fulfillment services provider is an order export service. For example, in addition to providing order fulfillment services to one or more merchants 40 through which orders for inventory items 35 may be shipped domestically, a fulfillment services provider may also facilitate the shipment of one or more inventory items 35 to international destinations on behalf of one or more merchants 40. Such an export service may include the services provider completing required export documents on behalf of merchants 40, calculating and collecting customs duties, and/or remitting customs duties to the appropriate taxing authority (e.g., a foreign customs office), in various embodiments.

Figure 4:
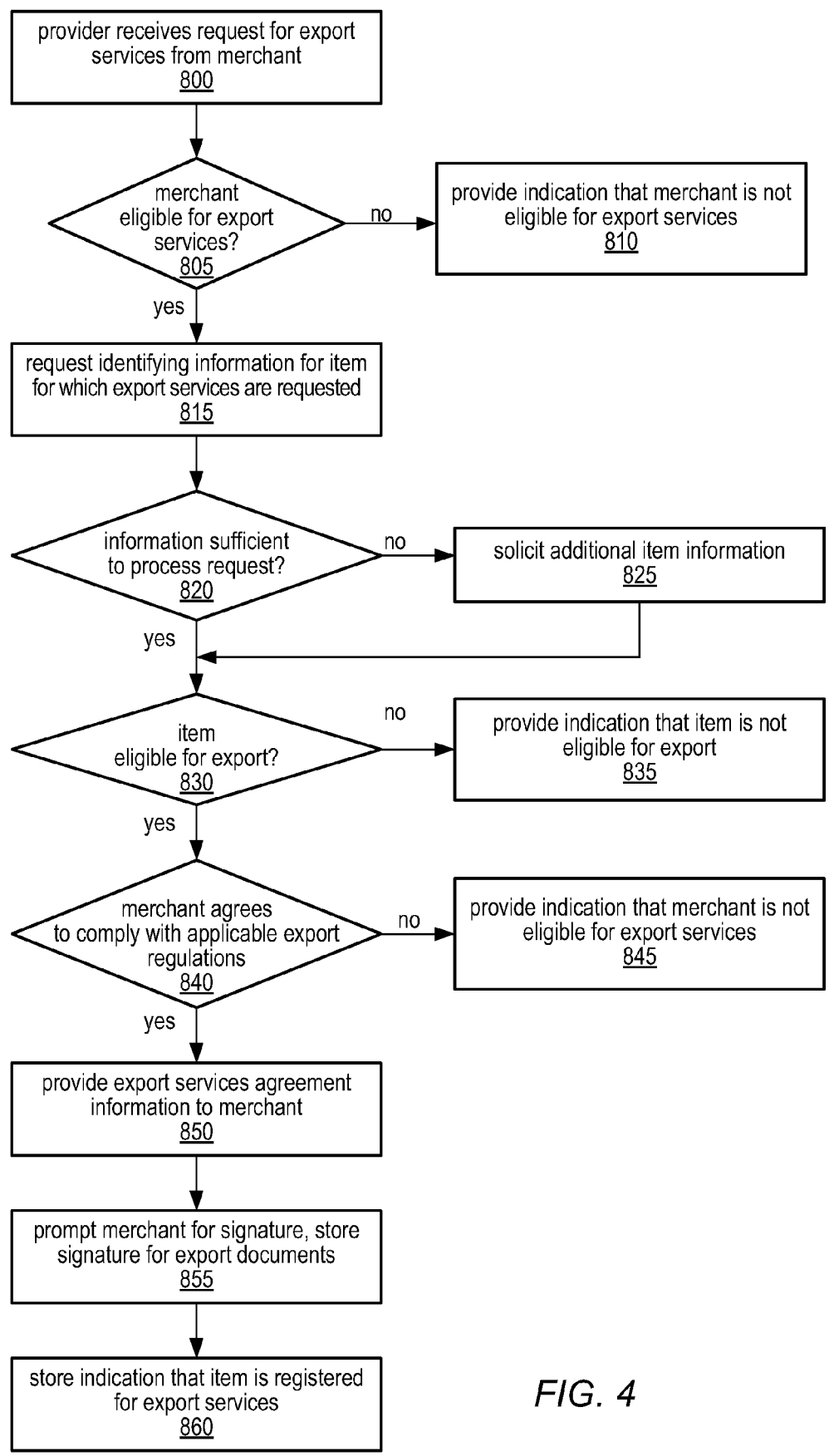
FIG. 4 is a flow diagram illustrating one embodiment of a method through which a fulfillment services provider may receive and process a request for export services from a merchant.

One embodiment of a method through which a fulfillment services provider may receive and process a request for export services from a merchant is illustrated in FIG. 4. In this example, the fulfillment services provider may receive a request for export services from a given merchant 40, as in 800. Such a request may be received directly from merchant 40 or on behalf of merchant 40 via a registration interface, such as registration interface 200. For example, merchant 40 may sign into a secure web page using a merchant identifier and appropriate credentials (e.g., a login name and password, or any other suitable type of credentials), and may subsequently select an option to request export services (e.g., using a link, a radio button, etc.) displayed via the secure web page. In other embodiments, a request to receive export services may be received via web services calls or via a mode of communication that does not employ web-based protocols.

In order to determine if the request for export services is valid (i.e., that it may be successfully processed), the method may include both determining if merchant 40 is eligible to receive export services, as in 805 of FIG. 4, and determining if the items 35 for which merchant 40 requests export services may be legally exported, as in 830 of FIG. 4. Determining if merchant 40 is eligible to receive export services may in various embodiments include searching for an identifier of the merchant on a government watch list, performing a criminal background check, credit check, or other authentication check of merchant 40, or determining if merchant 40 is already receiving order fulfillment services from the service provider (i.e., merchant 40 may have already been approved to receive services from the provider, as described above). In some embodiments, merchant 40 may not be eligible to receive export services because of the nature of their business. For example, if all of the merchant's items 35 are classified such that they may not legally be exported, merchant 40 may not be eligible to register for export services, whether or not they are eligible to receive domestic order fulfillment services. In other embodiments, the merchant may be determined to be eligible to receive export services for some, but not all, of his or her items 35, as described in more detail below. In some embodiments, various eligibility checks may be performed automatically in response to a request for services, such as by one or more software modules configured to access such background information and/or perform such checks, while in others such checks may be performed by or initiated by an agent of the fulfillment services provider.

If it is determined that merchant 40 is not eligible to receive export services, indicated as the negative exit from 805, an indication may be provided that merchant 40 is not eligible to register for such services, as in 810. For example, if the request for export services is received via a web interface, an indication that merchant 40 is not eligible to receive export services may be displayed in one or more input/output fields of a request and/or response web page.

If it is determined that merchant 40 is eligible to receive export services, indicated as the positive exit from 805, the method may include requesting information identifying one or more items 35 to be registered as eligible for export by the services provider on behalf of merchant 40, as in 815. For example, in some embodiments, each request for export services may include a request for export services for a single item 35 or category of items 35 provided by merchant 40. In other embodiments, each request for export services may include a request for export services for a list of items 35 (e.g., a list of item identifiers). Such a list may include any (i.e., any subset) or all of the items 35 offered by merchant 40, in different embodiments. For example, one request for export services may include a single request for export services for all of the merchant's items 35 that are currently included in a registration for order fulfillment services, (and/or for any additional items added to the items 35 handled by the fulfillment services provider in the future) without listing the individual items themselves. In some embodiments, processing a request for export services may include the fulfillment services provider determining which, if any, of the merchant's products may be legally exported and providing an indication that those items 35 may be eligible for export services. In some embodiments, merchant 40 may be presented with a list of items 35 currently being handled by the fulfillment services provider and may be prompted to identify the items 35 for which export services are requested.

In addition to identifiers of items 35 for export services, other information about the items 35 may be required in order to register merchant 40 to receive export services. If the fulfillment services provider does not have sufficient information about the items 35 to process an export services request, indicated as the negative exit from 820, the method may include soliciting additional information from merchant 40, as in 825. For example, any or all of the following may be requested: a weight of an item, dimensions of an item, a classification of an item (e.g., an Export Control Classification Number—ECCN, or Harmonized Tariff code—HS), and a value or cost of an item. In other embodiments, the ECCN and/or HS code for inventory items 35 may be determined by the fulfillment services provider.

In some embodiments, merchant 40 may also be prompted to indicate the particular countries and/or regions to which he or she would like to export items 35 and/or particular countries and/or regions to which merchant 40 does not desire to export items 35. These restrictions may be specified for individual items 35 or categories of items 35 or for all of the merchant's items 35, in different embodiments. For example, merchant 40 may indicate that he or she wishes to receive export services for shipping any of his or her items 35 registered for export services to destinations in the countries of the European Union (EU), but not to destinations in Cuba, South America, Asia, or Africa. In another example, merchant 40 may indicate that books may be shipped to any country or region, but software products may only be shipped to EU countries. In yet another example, merchant 40 may not specify any restrictions on destinations, but may indicate a request for export services for any legal combination of items 35 and destinations, as determined by the fulfillment services provider when an order is received. In some embodiments, merchant 40 may be prompted to provide information indicating a list of specific entities (e.g., persons or companies) to which the merchant does or does not authorize export of some or all of its products. For example, merchant 40 may specify that some or all of its products are only authorized to be exported to persons or companies with which it has an established business relationship (e.g., those identified on a list provided to the services provider).

Any additional information requested of and received from merchant 40 may be provided via a web interface, as described above, or through any other suitable user interface mechanism. For example, merchant 40 may be prompted to provide additional information in an email, and may respond by sending a reply email. In another example, merchant 40 may be prompted to provide additional information in an email and may be given instructions regarding how to provide the additional information via the fulfillment services provider's web site.

In some embodiments, merchant 40 may be offered an opportunity to provide one or more logos for the services provider to use when shipping one or more items 35 to domestic or international destinations. Such logos may be associated with a particular item 35 or category of items 35, with merchant 40, and/or with the services provider, in different embodiments. These logos may in various embodiments be included on packaging (e.g., shipping boxes or other containers) and/or on documents (e.g., packing lists, packing labels, export documentation, invoices, etc.) related to a shipment that includes one or more items 35 provided by merchant 40. For example, a merchant's logo may be received and/or stored as an image file (e.g., a .jpg, .tif, .bmp, or .gif file) and may be formatted according to a size and/or aspect ratio suitable for printing on export documentation (e.g., a shipping label or other documentation) or directly on a shipping container (e.g., a box or packing envelope).

Once sufficient information has been received regarding the item(s) 35 for which export services are requested, the method may include determining if the item(s) 35 are eligible for export, as in 830. In some embodiments, this determination may include searching for the item(s) 35 on one or more governmental lists used in regulating exports, such as the Commerce Control List (CCL) and/or the U.S. Munitions List (USML). These and other lists may provide information indicating that one or more items 35 for which the merchant has requested export services may not be exported at all or may not be exported to particular countries, entities, or persons (e.g., those included on a denied persons lists, unverified persons list, entity list, specially designated nations list, debarred list, or non-proliferation sanctions list), as described in more detail below. For example, one or more items 35 may be restricted for export depending on their classification (e.g., their ECCN classification) as defense articles (including technical data), or may be restricted for reasons of crime control (e.g., pornography, or materials violating copyright law), weapons control, national security, nuclear non-proliferation, regional stability, U.S. or U.N. embargos, agricultural restrictions, anti-terrorism, or other reasons. Some items 35 that may be exported to all or a subset of international destinations may require a validated export license, which may be included in export control documentation to be generated and provided to an international carrier and/or one or more government agencies. For example, the export of items that require a validated export license may require that a Shipper's Export Declaration (including a merchant's export license number) be generated, in addition to or instead of standard export control documentation required of all exported shipments (e.g., a form CN 22 and/or CP 72, as described below).

In some embodiments, a fulfillment services provider may decline to provide requested export services due to a business policy of the service provider, rather than due to a regulatory restriction. For example, a service provider may make a business decision not to provide export services to merchants with whom they do not already have a business relationship, or to merchants with whom they have had unsatisfactory business experiences in the past. In another example, a fulfillment services provider may make a business decision not to export to particular countries, even if there are no legal restrictions to exporting to those countries. In yet another example, a fulfillment services provider may make a decision not to export particular items or categories of items that require special handling, additional documentation, or other non-standard international shipping procedures (e.g., hazardous materials, items classified as dual-use technologies, or items exceeding a given size, weight, or value) or to export such items in split shipments (e.g., separately from items that may be shipped using standard procedures).

While in the embodiment described above, determining if the items 35 are eligible for export includes searching for the items on one or more lists of restricted items, in other embodiments determining if the items 35 are eligible for export may include prompting the merchant 40 to indicate that he or she certifies that the items 35 are eligible for export according to current regulations.

As illustrated in FIG. 4, if it is determined that one or more items 35 for which merchant 40 has requested export services are not eligible for export services, indicated as the negative exit from 830, the method may include providing an indication that the item(s) 35 are not eligible for export, as in 835. For example, if the request for export services is received via a web interface, an indication that the one or more items 35 are not eligible to receive export services may be displayed in one or more input/output fields of a request and/or response web page.

If it is determined that the item(s) 35 for which merchant 40 has requested export services are eligible for export services (or a subset of the items 35 are eligible for export services), the method may include prompting merchant 40 to indicate that he or she agrees to comply with all applicable export regulations, as in 840. For example, merchant 40 may be presented with a summary of export regulations and/or links to various governmental agency websites on which such regulations are accessible, and may be asked to review these regulations before indicating agreement. In another example, merchant 40 may be presented with information indicating the items 35 for which export services have been requested and which are eligible for export to be reviewed before indicating agreement. This information may in some embodiments include an indication of any restrictions on the export of particular items 35, such as a list of countries to which they may or may not be legally exported. The information may also include a summary of the responsibilities and/or role of merchant 40 and a summary of the responsibilities and/or role of the services provider in meeting the applicable regulations. For example, it may include a description of the information that the merchant 40 must provide, a description of the export documentation the services provider will generate, and an indication of whether merchant 40 or the services provider will act as the Principal Party in Interest (e.g., the USPPI, or exporter of record).

Merchant 40 may provide an indication of whether he or she agrees to comply with the applicable export regulations by entering a digital signature or personal identification number (e.g., a PIN), selecting a checkbox or radio button on a web page, or using any other suitable user interface, in various embodiments. In response to merchant 40 indicating that he or she does not agree to comply with the applicable export regulations, indicated as the negative exit from 840, the method may include providing an indication that merchant 40 is not eligible to receive export services from the fulfillment services provider, as in 845.

In response to merchant 40 indicating that he or she agrees to comply with the applicable export regulations, indicated as the positive exit from 840, the method may include providing export services agreement information to merchant 40, as in 850. For example, in one embodiment, a document may be presented to merchant 40 outlining the services to be provided, the costs associated with these services, and/or the role of merchant 40 and the services provider in complying with applicable export regulations, as described above. An export services agreement may in some embodiments include a list of items included in the registration for export services, a description of any policies of the services provider regarding limits on the value of items that may be exported under the agreement, the types of items that may (or may not) be exported under the agreement, and/or the destinations to which the provider will (or will not) export items under the agreement. An export services agreement may also include a description of a return policy for exported items (e.g., whether or not returns will be accepted by the provider for undeliverable, refused, or damaged items and/or how any costs associated with replacement, return shipping, or restocking of such returns may be allocated between merchant 40 and the provider, if applicable), an indication of whether the provider will (or will not) calculate and collect customs duties (e.g., expected import duties) for exports, and/or an indication of whether merchant 40 or the provider is responsible for classifying items for export (e.g., for determining their ECCN or HS code). In some embodiments, an export services agreement may include a statement that merchant 40 releases the fulfillment services provider of any liability related to international shipment of its inventory items (e.g., for handling of and costs related to product returns, tax or tariff exposure, or compliance with applicable export regulations). An export services agreement may in some embodiments also include a description of the provider's policy regarding splitting of shipments for orders of items from multiple merchants 40, as described herein, and/or an indication of how international shipments will be labeled and/or branded (e.g., using a logo of one or more merchants 40 and/or a logo of the fulfillment services provider). An export services agreement may be implemented as an electronic document that is transmitted to merchant 40 (e.g., via email) or may be an electronic document presented to merchant 40 via a web browser or other suitable user interface, in various embodiments.

As illustrated in FIG. 4, the method may include prompting merchant 40 to provide a signature, if he or she agrees to the terms of the export services agreement, as in 855. For example, merchant 40 may be provided with an input field of a web page into which he or she may enter a signature using a mouse, or may be prompted to enter a signature using a touchpad and stylus, and to submit the signature to the services provider. In still other embodiments, merchant 40 may be provided with an electronic document (e.g., an export services agreement) that may be printed out and signed by the merchant and the signed document may be returned to the services provider (e.g., by mailing the physical document, by facsimile transmission, or attaching a scan of the signed document to an email reply). In some embodiments, merchant 40 may be prompted to enter a signature electronically, and then to follow up by providing a hard copy of the signed document to the service provider at a later time (e.g., a printed and signed original document may be mailed to the service provider for their records). A signature provided by merchant 40 may in some embodiments be stored by the service provider for use in completing required export documentation on behalf of the merchant, as described in more detail below. For example, a merchant signature may be received and/or stored as a .pdf file or as an image file (e.g., a .jpg, .tif, .bmp, or .gif file) and may be formatted according to a size and/or aspect ratio suitable for printing on export documentation (e.g., a shipping label or other documentation).

As illustrated in FIG. 4, information regarding an agreement to provide export services for one or more items 35 for a given merchant 40 may be stored for later use, as in 860. For example, an identifier of merchant 40 may be stored in a table, database, or other data structure (e.g., database 210), along with a list of items 35 for which export services have been requested and/or for which they have been determined to be eligible (e.g., for items 35 that have been successfully registered to receive export services with the services provider). In some embodiments, additional information about the items 35 and/or terms of an export services agreement may also be stored in such a database. For example, a list of countries, regions, or entities to which merchant 40 has authorized exports may be included in the stored information, or a matrix structure mapping particular items 35 to countries, regions or entities to which they may or may not be exported may be included. In another example, an image file representing a signature entered by merchant 40 as part of the registration for export services may be included in the stored information and may be associated with merchant 40 and/or the merchant's items 35 that have been authorized for export by the service provider.

Note that while in FIG. 4 the operation of storing information about items 35 successfully registered for export is shown as a last step in a registration process (i.e., following signature of an export services agreement), in other embodiments this operation may be performed at another time, such as following the determination that certain items 35 are eligible for export or following receipt of an indication that merchant 40 agrees to comply with applicable export regulations. Similarly, other operations illustrated in FIG. 4 may be performed in a different order than that illustrated or may be omitted, in various embodiments, and/or other operations not illustrated may be included in a method for registering items 35 for export services.

In addition to the operations illustrated in FIG. 4, a fulfillment services provider may in some embodiments perform a compliance monitoring operation with regard to order fulfillment services and/or export services. In some embodiments, the service provider may perform regular and/or periodic searches of various government databases in order to receive and apply updates to its export services registration information. For example, lists of destinations, entities, or persons to which export of various items 35 are restricted or forbidden and/or lists of items eligible for export may be updated by the appropriate governmental authority and these changes may be applied to the operation of export services by the provider (e.g., by revoking a merchant's export services registration or agreement, removing an item 35 from a list of items eligible for export, or updating a mapping of items and destinations to which they may or may not be exported). In other embodiments, the provider may receive regular, periodic, or occasional updates from one or more governmental authorities and may use this information to determine if changes should be made to the export services registration information associated with a given merchant 40 and/or the merchant's items 35.

Another form of compliance monitoring that may be employed in some embodiments involves the use of feedback received by the export services operation. For example, if customer feedback indicates that the items 35 provided by a given merchant 40 are defective, are of low quality, or are offensive or otherwise unacceptable in a given market (e.g., in a particular country or region), the provider may remove the merchant 40 and/or items 35 from its export services program and/or may modify a list of destinations to which the items 35 may be exported, in different embodiments. In some embodiments, a component of compliance monitoring may include regular, periodic, or occasional inspection of items 35 received from a merchant 40 for domestic or international shipping to ensure that they are accurately represented in the provider's registry (e.g., that the description, size, weight and content match what was registered) and that they meet required policies of the provider and/or conditions agreed to by the merchant 40 at registration (e.g., they are legal to sell domestically and/or to export, they are of acceptable quality, they meet the service provider's business goals for respectability and non-offensiveness, etc.). In such embodiments, if any items 35 are determined not to meet the standards of the provider, they (and/or the merchant 40 providing them) may be removed from the export services program and/or the fulfillment services program.

Note that while an order export service has been described above as a service integrated with an order fulfillment service, in some embodiments, an order export service may be offered to merchants 40 who do not receive other order fulfillment services from the service provider. For example, a given merchant 40 may receive all orders for its items via its own order processing mechanisms. The merchant 40 may fulfill orders for its items 35 itself when they are to be shipped domestically, but may contract with an order fulfillment services provider to handle international shipments (e.g., to generate the proper export documentation; calculate, collect, and remit any customs duties; and/or ship orders to international destinations). In such embodiments, merchant 40 may provide items 35 to the provider to hold in inventory for potential international shipments or may provide items 35 to the provider for export services in response to receipt of an order for an international destination.

Order Fulfillment Process

As mentioned previously, a fulfillment services provider such as fulfillment center 10 of enterprise 5 may perform fulfillment services for a variety of items 35 offered in commerce by a number of different merchants 40. A merchant 40 may request such services via a self-service registration interface, as described above with respect to FIG. 3.

Once a merchant 40 has arranged to receive fulfillment services for an item 35 from a provider, the provider may proceed to fulfill customer orders. In one embodiment, a customer 50 may place an order for an item 35 directly with a merchant 40 via a channel through which the merchant 40 offers the item 35 in commerce (e.g., through e-commerce or other types of channels as described above). In one such embodiment, customer orders may be conveyed to fulfillment center 10 from a merchant 40 via inventory management system 30, either via interface 200 or via a different interface configured for order processing. In other embodiments, customer orders may be conveyed to fulfillment center 10 through a third party. For example, a merchant 40 may present its own order-entry interface to customers 50 and assume responsibility for conveying the order to fulfillment center 10 for fulfillment. Alternatively, a merchant 40 may arrange for enterprise 5 to host a commerce channel including an order-entry interface on behalf of the merchant, such that the merchant 40 may not be directly involved in receiving and processing the order, but may be fiscally and/or legally responsible for the order.

In some circumstances, a given customer 50 may place an order for two or more different items 35 offered in commerce by different respective merchants 40. For example, the given customer 50 may place separate orders with each one of the merchants 40, ordering a first item 35 or group of items 35 from a first merchant 40, a second item 35 or group of items 35 from a second merchant 40, and so on, in any suitable combination. Alternatively, the given customer 50 may place one or more orders via an e-commerce channel that allows the given customer 50 to concurrently view the offerings of more than one merchant 40. For example, the given customer 50 may use a virtual "shopping cart" into which items 35 offered by different merchants 40 can be placed for order processing. Such a shopping cart may allow the given customer's item selections for a particular order to persist across different e-commerce channels. For example, the contents of a customer's shopping cart may persist as the customer browses from one merchant's web site or listing page to a channel associated with another merchant 40. In some embodiments, a virtual shopping cart may simplify the customer's ordering experience, for example by allowing a customer 50 to submit one payment transaction for all items 35 in the cart rather than submitting separate payment transactions for each merchant 40 associated with those items. A virtual shopping cart may also facilitate identification of opportunities to consolidate items 35 ordered from multiple different merchants 40 by a given customer 50, as described in greater detail below.

In a conventional model of order fulfillment, items 35 ordered from different merchants 40 would be fulfilled separately, which may increase overall costs of fulfillment. For example, packaging and shipping a group of items 35 separately may cost more than packaging and shipping those items together. However, in some embodiments, a fulfillment services provider such as fulfillment center 10 may be configured to consolidate items 35 ordered by a single customer 50 from multiple merchants 40 such that at least some items 35 ordered from different merchants 40 are packaged and shipped as a single shipment, while each merchant 40 remains the merchant of record for its respective item 35. In shipping certain items 35 together, costs of fulfillment may be reduced and the resulting savings passed along to the customer 50 or retained as profit by merchants 40 and/or enterprise 5. At the same time, each merchant 40 may remain the merchant of record for items 35 it offers in commerce, retaining the fiscal, legal and/or other obligations and benefits associated therewith. That is, although the fulfillment services provider may have physical custody of items 35 for which it provides fulfillment services on behalf of merchants 40, the provider may simply function as an intermediary, rather than a principal, in transactions between merchants 40 and customers 50. In various embodiments, the role of the provider in fulfilling an order may or may not be visible to a customer 50.

Figure 5:
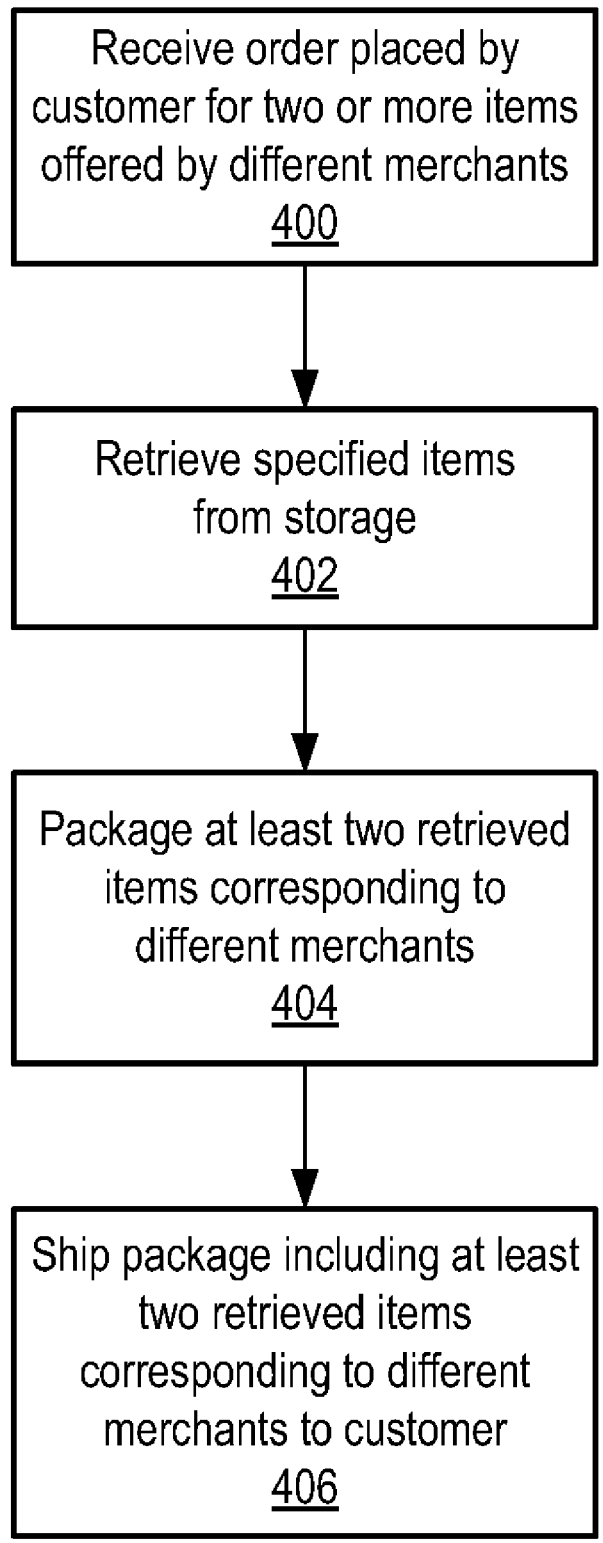
FIG. 5 is a flow diagram illustrating one embodiment of a method of fulfilling orders for items on behalf of a number of merchants.

One embodiment of a method of fulfilling orders for items 35 on behalf of a number of different merchants 40 is illustrated in FIG. 5. Referring collectively to FIGS. 1-5, operation begins in block 400 where a fulfillment services provider such as fulfillment center 10 receives one or more orders placed by a customer 50 for at least two different items 35 offered in commerce by different respective merchants 40. In some embodiments, one or more of the merchants 40 may have requested fulfillment services for its corresponding ordered item 35 via a self-services fulfillment services interface, such as interface 200, as described above with respect to FIG. 3. As described previously, the order(s) may be received from merchants 40, directly from the customer 50, or via a third party. In embodiments where a virtual shopping cart is employed, the relationship among the different items 35, the different merchants 40 and the ordering customer 50 may be explicit or implicit in the data records generated as a result of processing the virtual shopping cart contents. For example, the virtual shopping cart may assign a common order identifier to each item 35 that forms a component of the customer's order, which may facilitate the provider's combining of items 35 into shipments as described below.

In some embodiments, if multiple distinct orders are received from a single customer 50, either from the same or different merchants 40, the orders may be linked by the provider, for example on the basis of a common customer identifier or a common order identifier that may be coordinated among merchants 40 and the provider. Once identified as linked or related, the multiple orders may be processed as a single order for the fulfillment processes described below, to the extent possible. In some such embodiments, the provider may only link orders that are placed or received within a given interval of time, such as orders placed within one hour, one day, etc. The interval may depend on the mode of delivery specified by the customer. For example, if a customer 50 requests expedited shipping for a given order, the interval of time for linking the given order to other orders may be relatively short to prevent delay in shipping the given order.

Subsequent to receiving the order(s), the specified items 35 may be retrieved from storage (block 402). For example, in one embodiment, customer orders may be processed by inventory management system 30 to generate instructions for a human or mechanical picker to select the specified items 35 from within inventory storage facility 20. It is contemplated that in some embodiments, the specified items 35 may be retrieved along with other items 35 destined for unrelated orders. For example, system 30 may divide a number of orders up among multiple pickers in order to optimize picker efficiency, particularly in instances where the items 35 specified in a given order are widely distributed throughout fulfillment center 10.

At least two of the retrieved items 35 corresponding to two different merchants 40 may then be packaged (block 404). For example, the retrieved items 35 may be delivered to a packaging area within fulfillment center 10 to be appropriately packaged for shipment, which may include selection of appropriate boxes or other enclosures, insertion of protective packing materials, and/or inclusion of a packing slip, invoice, manifest, promotional materials or other materials. In some embodiments, if all items 35 corresponding to the customer's order(s) are present in the fulfillment center 10, they may be packaged as a single package for shipment, or divided among multiple packages if cost, item characteristics or shipper requirements dictate. In some cases, fulfillment of ordered items 35 may be distributed across different fulfillment centers 10, for example depending on item availability.

Subsequently, a package including at least two items 35 corresponding to two different merchants 40 may be shipped to the customer 50 (block 406). For example, the package or packages may be tendered to a common carrier for shipping.

Figure 6:
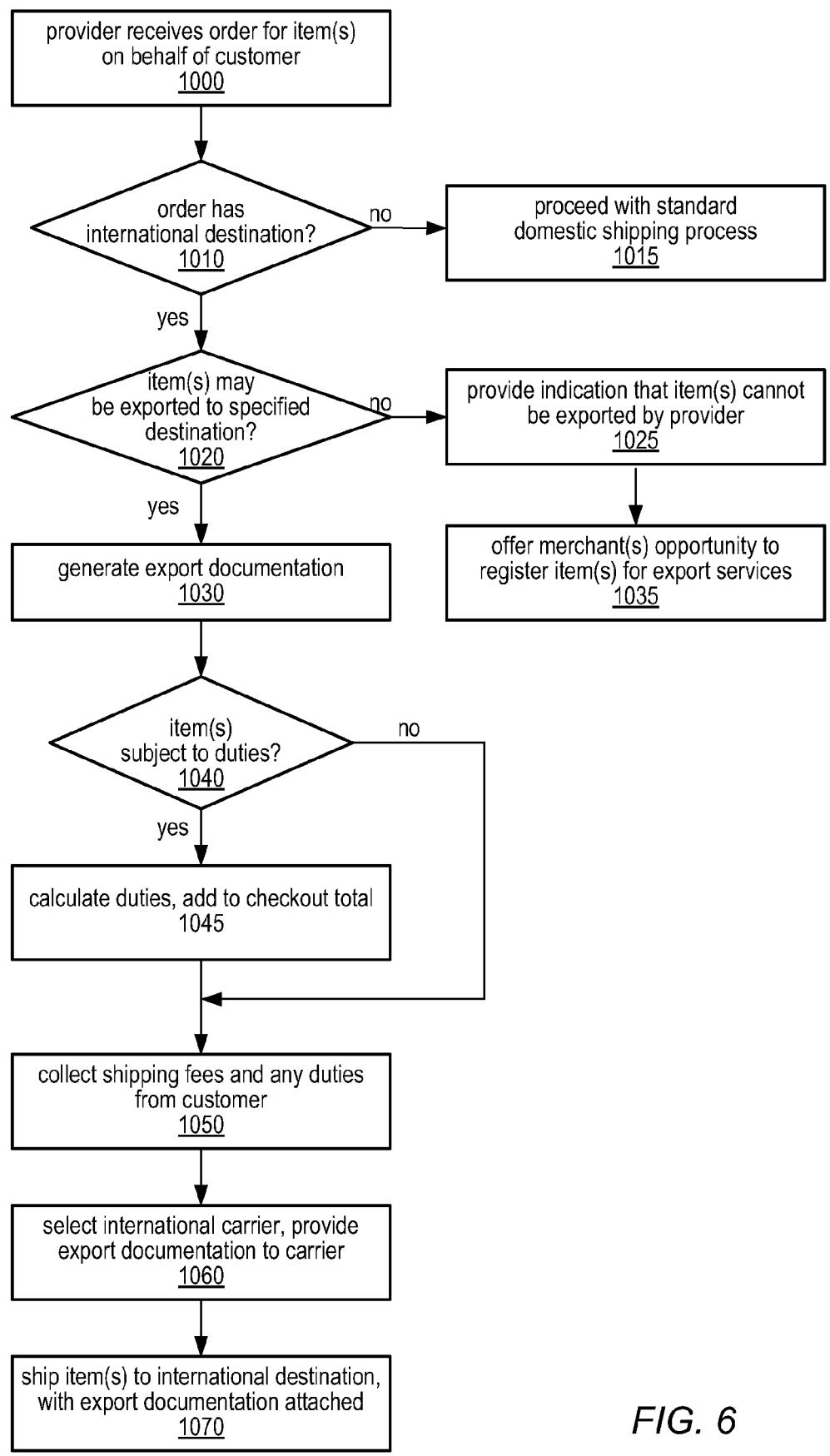
FIG. 6 is a flow diagram illustrating one embodiment of a method of fulfilling orders for items registered for export services.

The method illustrated in FIG. 5 may be applicable to fulfillment of orders to be shipped to domestic destinations on behalf of one or more merchants 40 receiving order fulfillment services from an order fulfillment services provider. As described above, a fulfillment services provider may also facilitate the shipment of orders to international destinations on behalf of a merchant 40 by providing various export services. One such method is illustrated in FIG. 6. In this example, a fulfillment services provider may receive an order for one or more items 35 on behalf of a customer 50, as in 1000. In various embodiments, the order may be received by the fulfillment services provider directly from the customer 50, through one or more merchants 40 offering the item(s), or through a third party, as described above.

As illustrated in FIG. 6, the method may include determining if the order has an international destination address, as in 1010. If it is determined that the order does not have an international destination address, indicated by the negative exit from 1010, the method may include proceeding with a standard shipping process for domestic orders, such as that illustrated in FIG. 5. This is shown at block 1015. If, on the other hand, it is determined that the order has an international destination address, indicated as the positive exit from 1010, the method may include determining if the items 35 included in the order are eligible for export to the specified international destination, as shown at 1020. Determining that the items 35 are eligible for export to the specified international destination may include both determining that the items 35 are registered to be exported by the fulfillment services provider and that they may be legally exported to the specified international destination and/or entity. In general, determining if an order request that includes exporting one or more items 35 is legally permissible may include determining what is to be exported, where it is going, who will receive it, and how it will be used.

Determining that the items 35 are registered for export services may in some embodiments include searching a table, database, or other data structure (e.g., database 210) for information indicating that the particular items 35 have been determined to be eligible for exporting and/or that the merchants 40 providing those items 35 have been successfully registered to receive export services for the items 35.

As noted above, determining that the items 35 may be legally exported to the specified destination and/or entity may include comparing the items to one or more lists of items (e.g., the CCL or USML), and/or determining if the destination, entity, and/or person receiving the item 35 may legally receive them. For example, in some embodiments, the fulfillment services provider may receive information identifying an entity and/or person that will receive the item, in addition to a destination address. The fulfillment services provider may in some embodiments compare these identifiers to various lists of destinations, entities, or persons eligible and/or ineligible to receive particular exported items 35. For example, a comparison may be made between one or more identifiers of an order recipient and a denied persons list, unverified list, entity list, special designated nationals list, debarred list, non-proliferation sanctions, UN embargo list, or other watch list, in some embodiments. In another example, another kind of check may be performed using an identifier of a recipient, such as a criminal background check or an authentication of the recipient's business affiliation and/or address. These comparisons and/or checks to determine if the recipient specified in the order may legally receive the items 35 may in some embodiments be performed automatically in response to receipt of an order having an international destination (e.g., by one or more software modules configured to perform the comparisons and/or checks) or may be initiated or performed by an agent of the provider, in different embodiments. In still other embodiments, a provider may decline to export one or more items 35 to a given international destination, entity, or person dependent on an internal policy, such as that described above regarding acceptance of a request for export services. For example, a provider may decline to export items 35 to a particular entity with which it has had a previously unsatisfactory business relationship or that engages in a type of business that the provider has chosen not to serve. In another example, a provider may decline to export items 35 to a particular country (even if legally permitted to do so) if it has received information about government corruption, looting of exported items, economic and/or political instability, or customer complaints regarding the delivery of exported items to that country, according to the business practices of the fulfillment services provider.

If it is determined that one or more items 35 of the order are not eligible for export to the specified destination, indicated as the negative exit from 1020, the method may include providing an indication that the item or items 35 cannot be exported by the fulfillment services provider to the specified destination, as in 1025. For example, in one embodiment, if the customer enters the order through a web interface, an indication that one or more items in the order cannot be exported by the fulfillment services provider as requested may be presented to the customer in an input/output field of an order entry/processing web page. Such an indication may also be provided to a merchant 40 that provides one or more of the items included in the order (e.g., an indication may be provided that a customer order was received, but that the provider was not able to fulfill it). In some embodiments, if any or all of the items may not be exported as requested, the order entry process may be terminated (not shown). In other embodiments, if at least one of the items may be exported by the fulfillment services provider to the destination requested, the order fulfillment process may proceed, as in 1030. In some embodiments, if one or more items in the order (and/or the merchants providing them) are not registered for export services, the method may include offering the merchant providing those items an opportunity to register the item or items for export services, such as using the method illustrated in FIG. 4. This is shown at block 1035.

As illustrated in FIG. 6, if any of the items in the order are registered for export service, the method may include generating export documentation for the shipping of those items to the requested international destination, as in 1030. Generating export documentation for shipping the eligible items may in some embodiments include accessing a table, database, or other data structure to obtain information about the items, and/or the merchants that provide them, that may be necessary for completion of the export documentation. For example, the method may include extracting (based on an identifier of the given merchant 40 and/or identifiers of the items 35) address information for the merchant 40, tax and/or license information for the merchant 40 (e.g., a federal tax identifier, export license number, export license exception code, and/or other regulatory identifier) export services preferences of the merchant 40 (e.g., which items have been authorized by the merchant 40 for export and/or destinations or entities authorized to receive exports or restricted from receiving exports, as described earlier), a logo received from the merchant 40, and a signature provided by the merchant 40 when registering to receive export services. Generating export documentation for the shipping of the eligible items 35 may include determining that the particular items 35 ordered are eligible for export to the particular destination and/or entity specified in the order, such as when some items are eligible for export to some, but not all, destinations and/or entities (e.g., by regulation, or by a policy of merchant 40 or of the fulfillment service provider).

The number and type of export documents generated by the fulfillment services provider may be dependent on various factors, such as the particular item 35 or items 35 ordered, the merchant(s) supplying those items, the destination of the order, the value of the items, and the purpose of the shipment (e.g., whether the items are being shipped as a gift or for commercial use between two business entities). For example, a form CN 22 (also known as Postal Service form 2976, Sender's Declaration—green label) may be generated for orders including only items that are classified as other than defense articles or other types of restricted technology, when the value of the items is below a given threshold and/or weight. In another example, a form CN 22 and a form CP 72 (also known as Postal Service form 2976-A, Customs Declaration and Dispatch Note) may be generated for orders including non-restricted items that exceed these value and/or weight thresholds. Shipments of these orders may be covered by a General Export License and may be marked by the fulfillment services provider to indicate "Export License Not Required," in some embodiments. Forms CN 22 and CP 72, when complete, may include (when applicable): an indication of whether the package contains a gift, documents, merchandise, commercial samples, or other categories of items; a description of each item and its quantity; the weight of each item; the value of each item; a Harmonized Tariff code (HS number) for each item; the country of origin for the items; a total weight and/or value for the items; the full name and address of the sender (merchant); the full name and address of the addressee (the ultimate consignee); a license number, a certificate number, or an invoice number (if they accompany the shipment); an indication of whether the shipment includes items subject to quarantine; instructions for disposal in the event that the package cannot be delivered (e.g., "Treat as Abandoned"); a merchant signature; and a date. Forms CN 22 and/or CP 72 may be provided to the carrier in physical form or in electronic form for use when shipping the order. For example, form 2976 may be attached to the outside of certain types of packages (e.g., international flat-rate envelopes and first-class international mail) when the value of the items is below a regulated threshold. For packages including items with a value over the regulated threshold, the upper portion of form 2976 (above a "cut" line on the form) may be attached to the outside of the package and a form 2976-A (including a detailed description of the items) may be enclosed in the package.

In other cases, a Shipper's Export Declaration form, or SED (also known as form 7252-V) may be generated for individual items having a value greater than a regulated threshold value (e.g., $2500 at the time of the filing of this application), or for items classified in a category for which an export license is required (e.g., defense articles, nuclear technology, chemical or biological weapons, missile technology, firearms, but not certain categories of technical data). An SED form, when complete, may include (when applicable) a name and address of the USPPI; a tax identifier of the USPPI; the name and address of the ultimate consignee and any intermediate consignees or forwarding agents; transportation information; a point of origin for items; a description of the items (including a commodity code, a quantity, a weight, a value, and a product or vehicle identifier); an export license number, license exception symbol or authorization code; the name, title, contact information, and signature of an authorized officer or employee of the USPPI; a date of exportation; and a document date.

In some embodiments, export documentation, such as the documents described above, may be generated (i.e., created and printed) by the fulfillment services provider according to the standards for format, size, and content specified by applicable regulations. In such embodiments, documents printed by the fulfillment services provider may also include a unique print authorization number (barcode), as certified according to U.S. Postal Service and other governmental requirements. In other embodiments, generating these documents may involve filling in various entries of documents received from the agencies regulating exports (e.g., the Department of Commerce, the U.S. Postal Service, etc.). Export documentation automatically generated by an inventory management system of a fulfillment services provider may be output in a file in a word processing format, as a Portable Document Format (PDF) file, as an image file (e.g., .jpg, .tif, .bmp, or .gif file), or in any other format suitable for electronic presentation and/or printing, in various embodiments.

The number and type of export documents generated by the fulfillment services provider may in some embodiments also be dependent on a business policy of the provider regarding the assumption of the role of USPPI for exporting an order. For example, if a policy of the provider is that each merchant 40 assumes the role of USPPI for the export of the items 35 that it provides, one set of export documents may be generated for each merchant 40 providing one or more items 35 for a given order. In such embodiments, the order may be divided into multiple partial orders for shipping (e.g., multiple partial shipments), with each partial shipment including items from only one merchant 40, and including its own corresponding set of export documentation.

In other embodiments, a policy of the provider may be that the provider assumes the role of USPPI for some or all of the items 35 included in the order. For example, in one embodiment the provider may assume the role of USPPI for all of the items 35 in an order that are provided by one or more trusted merchants 40 (e.g., merchants with which the provider has a history of successful business collaborations), while the role of USPPI may be retained by one or more other merchants 40 providing items 35 for the order, but with which the provider does not have such a track record. In such embodiments, one set of export documentation may be generated for all the items for which the provider assumes the role of USPPI, and an additional set of export documentation may be generated for each of the other merchants 40 retaining the role of USPPI for their items. In another example, a fulfillment services provider may assume the role of USPPI for a complete order, and may ship any or all of the items included in that order from multiple merchants 40 together, along with a single set of export documentation indicating the provider as the USPPI for those shipments. The role of a merchant 40 and/or a fulfillment services provider as USPPI may in some embodiments be specified by the merchant 40 and/or the fulfillment services provider as part of the export services registration process and may be indicated in an export services agreement generated as a result of the registration process, in some embodiments.

As previously noted, in some embodiments, the method may include determining if one or more of the items to be exported are subject to customs duties levied by the government of the receiving entity or destination. This is illustrated at block 1040. If one or more of the items are subject to customs duties, illustrated as the positive exit from 1040, the method may include calculating the duties owed and adding them to the total cost of ordering and/or shipping the items, as in 1045. For example, duties may be levied on certain types of items according to their value or weight, and the method may in some embodiments include accessing this information from a table, database, or other data structure (e.g., database 210) in order to calculate what is owed. The method may also include remitting these customs duties to one or more appropriate taxing authorities (e.g., a foreign customs office at the destination and/or at the location of any intermediate consignees) after collecting them during a checkout operation. If no customs duties are owed on any of the items to be exported, the method may proceed as in 1050.

As illustrated in FIG. 6, the method may include the fulfillment services provider collecting shipping fees (and any duties owed), as in 1050. For example, the total cost of ordering and shipping the items to its international destination may be presented to the customer via a web interface, such as on a "checkout" screen, in some embodiments. The method may include prompting the customer to submit payment, such as by entering credit card or purchase order information using a secure payment mechanism. As noted above, collecting payment may include collecting and remitting customs duties to the appropriate taxing authority or authorities, in some embodiments. For example, an additional line item may be presented during checkout indicating an "import fees deposit" to be collected by the fulfillment services provider, and this amount may be included in the total cost of ordering and shipping the items to the international destination.

In the example illustrated in FIG. 6, once payment has been received for the order, an international carrier may be selected and the export documentation that was generated (as in 1030) may be provided to the carrier, as in 1060. For example, a hard copy (e.g., printed version) of the required export documentation may be provided to the carrier so that it may be physically attached to the shipment, and/or an electronic manifest may be provided to the carrier for internal record-keeping and tracking of the shipment, for auditing of compliance to export regulations, and/or so that the carrier may print out a physical copy of the documentation to attach to the shipment, in different embodiments.

In some embodiments, selection of an international carrier may be dependent on factors such as the destination (e.g., not all carriers may serve all possible international destinations), the contents of the order (e.g., the size or weight of the items, or whether the order includes hazardous or fragile items), the relative cost of shipping the order via two or more carriers, the requested delivery date (e.g., if expedited or priority international shipping was requested vs. standard international shipping with a wider delivery window), or other factors. As previously noted, an order may be broken up into multiple international shipments, in some embodiments. In such embodiments one carrier may be selected for all of the items in the order (e.g., for all of the partial shipments) or a carrier may be selected for each partial shipment independent of selections made for other partial shipments of the order.

In some embodiments, a transportation method selector (e.g., a software module configured to determine an appropriate shipping method for a given order) may access data indicating whether or not specified items 35 are eligible to be shipped to the specified destination, rather than such a determination being made earlier (e.g., at the time the order is received). As noted above, in different embodiments, data suitable for making such a determination may be stored in a table, database, or other data structure (e.g., database 210) following a successful registration for export services and/or may be accessed via one or more governmental agencies maintaining information about what items may or may not be exported and/or destinations, entities or persons that may or may not receive such exports. In some embodiments, if a transportation method selector determines that the items are not eligible for export to the specified destination, it may be configured to return an indication that the items are not eligible for export to the specified destination (e.g., an error message may be returned to the customer in an input/output field of an order request/processing web page). If the transportation method selector determines that the items are eligible for export to the specified destinations, the selector may in some embodiments be configured to display all valid shipping options (e.g., standard, expedited, and/or priority international shipping from one or more international carriers) for the order and to allow the customer to choose from those options.

As illustrated in FIG. 6, once one or more international carriers are selected, the method may include shipping the order (e.g., in a single shipment or in multiple partial shipments) to the international destination specified in the order, as in 1070. As noted above, in some embodiments customs duties may have been calculated and collected by the fulfillment services provider, and may be remitted to the appropriate taxing authority before the shipment arrives, thus facilitating the receiving operation at the destination.

One embodiment of a packing slip that may be included in a package fulfilled according to the method of FIG. 5 is shown in FIG. 7A. In the illustrated embodiment, packing slip 500 indicates that four items 35 are included within a shipment to the identified customer. Items A and B are indicated as having been offered by Merchant A. Item C is indicated as having been offered by Merchant B. Item D is indicated as having been offered by Merchant C. Thus, Merchants A-C are indicated as the merchants of record for their corresponding items A-D, yet the identified customer may receive items A-D as a single shipment. Other situations involving different numbers of items and merchants are possible and contemplated. It is noted that various embodiments, packing slip 500 may correspond to a customer invoice, billing document, bill of lading, or other document formatted to summarize order information.

It is further noted that in some embodiments, packing slip 500 may include multiple pages or components formatted in a variety of ways. For example, items 35 corresponding to different merchants of record may be indicated on different pages or sections of packing slip 500. In some cases, packing slip 500 may also include information or data in addition to information identifying merchants of record. For example, such information may include terms and conditions that may apply to a given item 35 or a transaction involving given item 35 with respect to the merchant of record, warranty information, customer service information (e.g., contact information for complaints, returns, exchanges, etc.), marketing or promotional information (e.g., offers of future discounts, coupons, etc.), or other types of information. In some embodiments, the information included by packing slip 500 may be customized or formatted to suit requirements or customs pertinent to the location of a customer. For example, different documentation requirements may apply to transactions involving customers located in different legal jurisdictions (e.g., states, countries, etc.). Packing slip 500 may be appropriately formatted to take such requirements or other factors into account.

Consolidation of items 35 ordered from multiple merchants into fewer shipments may result in lower fulfillment costs, as noted above. For example, by virtue of volume, fulfillment center 10 may have preferential access to discounted shipping rates relative to those available to individual merchants 40. Thus, by allowing its items 35 to be combined for shipment with items 35 from another merchant 40, a given merchant 40 may enjoy lower costs of shipping and packaging. Moreover, customer goodwill may be increased through more a timely and/or convenient shopping experience. For example, a customer's order may be completed more quickly through fulfillment from fulfillment center 10 than if each merchant 40 involved in the order fulfilled its portion separately. Moreover, in addition to the possibility of reduced shipping costs to the customer 50, fewer shipments may reduce customer inconvenience in taking delivery of items 35, for example if the customer 50 or the customer's agent must be present at the time of delivery.

It is noted that while order consolidation as described above may be sufficient to reduce fulfillment costs, such consolidation may not be necessary to do so. In some circumstances, the cost of fulfilling a single item 35 through fulfillment center 10 may be lower than if a merchant 40 were to perform its own fulfillment. For example, fulfillment center 10 may benefit from greater economies of scale, better infrastructure for inventory and supply chain management, or other advantages that result in reduced fulfillment costs relative to a merchant 40 performing its own fulfillment on a smaller scale.

In some instances, a merchant's registration of a given item 35 for fulfillment services via registration interface 200 may render that item 35 eligible for various services or promotional opportunities available to items 35 fulfilled by fulfillment center 10, such as a reduced-cost or expedited shipping promotion in which the customer 50 may receive free standard shipping, free expedited shipping, reduced-cost standard or expedited shipping, etc. Other promotional opportunities may include discounts against a current order, credits against future orders, loyalty program points, discounts or credits with partner merchants, or other types of promotions. Such eligibility may apply even to instances in which a customer 50 orders a single unit of the given item 35 without combining the given item 35 with other items 35 in the order. For example, in one embodiment the eligibility for a promotional shipping arrangement or other promotional opportunity of items 35 fulfilled by fulfillment center 10 may depend on the total price of a customer's order. In such an embodiment, if the given item 35 has a price sufficient to meet the eligibility criterion, the customer 50 may receive promotional consideration upon ordering a single unit of the given item 35, alone or in combination with other items 35 fulfilled by fulfillment center 10.

In some embodiments, the cost savings resulting from a merchant's self-service registration for fulfillment services as described above and/or the cost savings resulting from efficiencies of fulfillment center 10 may be used to fund promotional opportunities offered to customers, such as opportunities to receive reduced-cost or expedited shipping, item discounts, or other types of promotions. In other cases, such cost savings may be offered to merchants 40 as a discount or credit against charges for fulfillment services, as profit sharing or cooperative marketing funding, or in another suitable fashion. Such savings may also be retained by enterprise 5 or distributed among enterprise 5, merchants 40 and/or customers 50 in any combination of the foregoing ways.

As noted above, an order fulfillment services provider may in some embodiments provide export services to merchants registered for such services, and may ship orders to international destinations. As noted above, an order may in some embodiments be divided into multiple partial shipments according to the merchants providing each of the items in the order. For example, each partial shipment may include only items from a single merchant, which would be the USPPI for that partial shipment and on whose behalf export documentation would be generated for that partial shipment. FIG. 7B illustrates a packing slip 501 for such a partial shipment, according to one embodiment.

In this example, an order may be placed by a customer for delivery to an international destination that includes items A, B, C, and D (e.g., the same items included on packing slip 500 of FIG. 7A). In this example, three separate partial shipments may be shipped to the destination, each including items from a single vendor (merchants A, B, and C). Packing slip 501 illustrates one of three packing slips generated by the fulfillment services provider, that corresponding to items A and B, offered by merchant A. In this example, packing slip 501 indicates that these two items are to be shipping to a customer in the United Kingdom. The price of each item is included on the packing slip, along with any applicable customs duty and shipping costs. In this example, customs duties of $3.00 were calculated by the fulfillment services provider for these two items and were collected as an import fees deposit at the time the order was processed, as described above.

Packing slip 501 also includes the name and address of the customer, and an indication that this is the first of three packing slips associated with an order. In other embodiments, additional information may be included on a packing slip, such as the name and address of the merchant and/or fulfillment services provider, an order number, a date/time of the order and/or shipment, an identifier of any intermediate consignees (if applicable), an export license number, a company or product logo (e.g., for an item, the merchant, or the fulfillment services provider), or any other suitable information.

In this example, two additional packing slips may be generated for this order, one including item C, offered by merchant B, and one including item D, offered by merchant C. Each of these additional packing slips may include similar information to that illustrated in FIG. 7B and/or described above (e.g., the name and address of the customer, a listing of the items, the price of the items, any import fees collected by the fulfillment services provider, a shipping cost, a total cost, the name and address of the merchant or fulfillment services provider, an export license number, a logo, etc.).

In the example illustrated in 7B, the role of USPPI (i.e., the exporter of record), may be assumed by merchant A for the partial shipment represented by packing slip 501. In this example, merchants B and C would each assume the role of USPPI for one of the additional partial shipments (i.e., the partial shipment including items offered by the merchant). In other embodiments, the fulfillment services provider may assume the role of USPPI for any or all shipments related to a given order. For example, a fulfillment services provider may include all of the items A, B, C, and D in a single shipment for which the fulfillment services provider assumes the role of USPPI and for which one set of export documentation (and one packing slip) may be generated. In another example, the order illustrated in these examples may be divided into two or more partial shipments, and the fulfillment services provider may assume the role of USPPI for one, two, or all of the partial shipments and may generate export documentation for each of the partial shipments indicating that the fulfillment services provider is the exporter of record for the shipments.

As discussed above, in addition to generating packing slips for domestic and international orders, the fulfillment services provider may generate export documentation for international orders, such as forms CN 22 (2976), CP 72 (2976-A), and/or SED (7525-V), in various embodiments. FIG. 7C illustrates a shipping label 500 that includes a form CN 22 and that is generated by the inventory management system of a fulfillment services provider, as described herein. Note that FIG. 7C is meant to illustrate the contents but not necessarily the precise format of form CN 22, which is specified by various government regulations. In this example, shipping label 500 includes several fields common to many types of shipping labels, including the name and address of the seller (e.g., Merchant ABC), the name and address of the receiver (i.e., the ultimate consignee), and a transportation tracking barcode 510. In this example, shipping label 500 also includes a unique print authorization barcode and an export form CN 22 (illustrated as 530). The unique print authorization barcode may be generated by a merchant that has received authorization to print their own forms CN 22 and/or CP 72, according to applicable regulations.

In this example, export form 530 (or CN 22) includes a detailed description of the contents of the shipment, using Schedule B codes (the United States' 10-digit versions of the Harmonized Tariff system codes). In this example, a Schedule B code of 4901.99.0070 is listed for one item, which is the code for hardbound books. Export form 530 also includes the value of each item listed in the contents. In this example, a value of $10.00 is listed for the single book included in the shipment. In this example, export form 530 also includes freight and insurance costs, the total weight and total value of the shipment (including freight and insurance costs), an indication that the shipment includes merchandise (rather than a gift, commercial sample, or other category of purpose), and a field to be signed by a merchant to certify that the shipment does not contain any dangerous articles. As noted above, when a form CP 72 (Postal Service form 2976-A) will be included inside the shipping container, only the upper portion of form CN 22 may be completed and attached to the outside of the shipping container. In such cases, form CN 22 may be cut along cut line 535 and the bottom portion may be discarded.

Note that in some embodiments, all of the fields of export form 530 (including the merchant signature) and remaining fields of shipping label 500 may be filled in automatically by the inventory management system of the fulfillment services provider, using information stored in the system, provided by the merchant, provided by the customer, and/or accessible on one or more government web sites, as described herein.

While the methods illustrated in FIGS. 4 and 6 are described herein as being applied to providing export services to one or more merchants 40, in some embodiments, similar methods may be applied to the import of inventory items by the fulfillment services provider on behalf of one or more merchants 40. For example, in some embodiments, a merchant 40 registering to receive order fulfillment services from the services provider may be prompted to indicate whether or not any inventory items 35 must be imported from another country (i.e., a country of origin) in order to be conveyed to the provider for fulfillment of customer orders. If any items 35 for which the merchant 40 requests fulfillment services must be imported, merchant 40 may be prompted to indicate whether he or she desires the provider to provide import services for the items on behalf of merchant 40.

Providing import services on behalf of merchant 40 may include many of actions described above regarding providing export services on behalf of merchant 40. For example, providing import services may include one or more of: determining if the items 35 may be legally imported from their country of origin and/or from an entity or person supplying them; implementing a criminal background check, credit check, or identity authentication of an entity or person supplying the items 35; generating any import documentation required according to applicable regulations; calculating, collecting and/or remitting to the appropriate taxing authority any import duties applicable to the import of the items 35; selecting an appropriate international carrier to ship the items 35 to the provider; initiating shipment of the items 35 by the carrier and providing the required import documentation to the carrier; and receiving the items 35 to be stored along with other inventory items received from the merchant and/or other merchants that have been registered to receive fulfillment services and/or export services, in various embodiments.

As described previously, various aspects of the methods and techniques described above (e.g., various aspects of registration interface 200 and/or management interface 220) may be presented to merchants 40 or customers 50 through the use of web pages. Generally speaking, a web page may include data content as well as metadata content that may be configured to control the presentation of the data content. For example, a web page may include text, still images, video content, navigable links, or other types of data content, as well as metadata or instructions that may control the placement, appearance, interactive behavior, or other presentation aspects of the data content.

Often, the data and metadata contents of a web page may be coded in a language, such as a version of Hypertext Markup Language (HTML) or any other suitable language for web-based content implementation. Web page contents may be conveyed from a content source, such as a web host implemented by or on behalf of fulfillment center 10 or enterprise 5, to a client, such as a merchant 40 or a customer 50, over a network (e.g., the Internet or a private network) using a suitable transport protocol such as a version of Hypertext Transport Protocol (HTTP), for example. The contents may then be interpreted or processed, as indicated by the coding language and metadata content, by a suitable client application such as a web browser. Some exemplary types of web browsers include, but are not limited to, Microsoft Internet Explorer™, Mozilla Firefox, and Opera™. In addition to presenting the web page to a client, the web browser may also collect and process input data from the client. For example, the browser may detect the selection or activation of navigable links, menu items, buttons, or other types of input devices that may be presented to a client, and may operate in response to such selection or activation by conveying data back to the content source or another entity or system, navigating to a different content source, or performing another suitable action.

Figure 8:
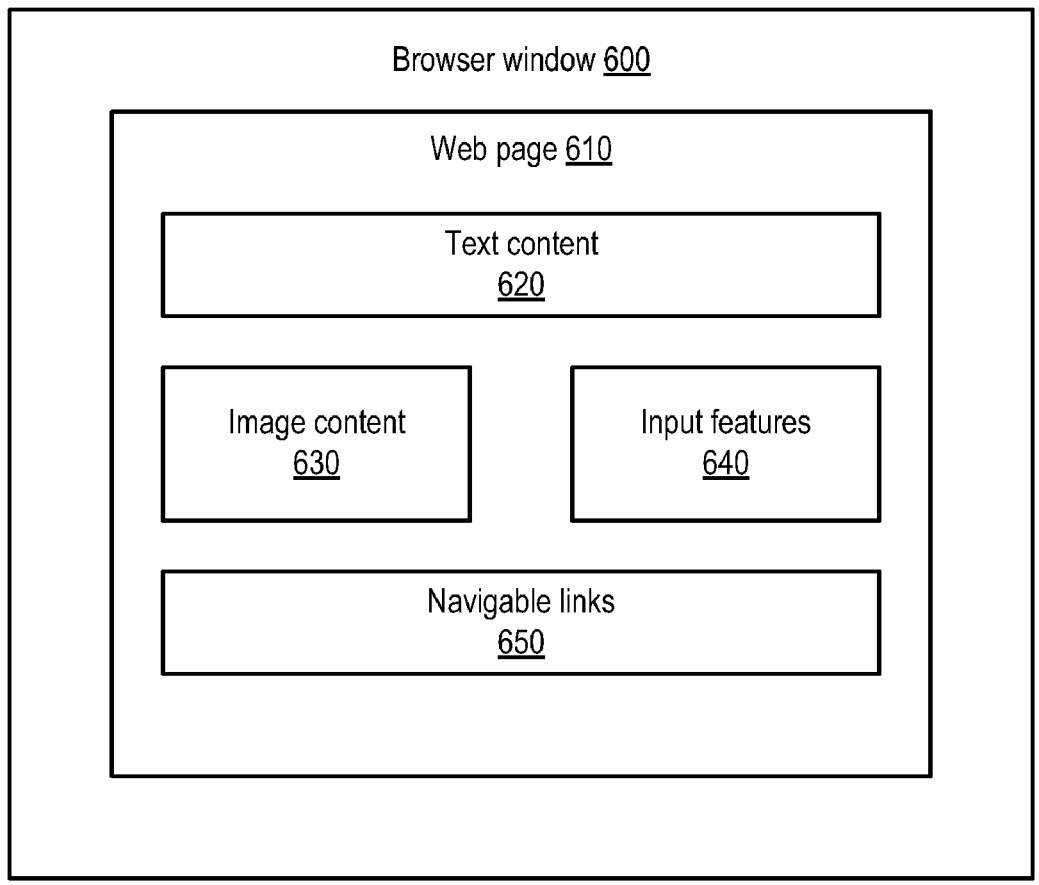
FIG. 8 illustrates one embodiment of a web page.

One embodiment of a generic web page is illustrated in FIG. 8. In the illustrated embodiment, a browser window 600 is shown to include web page 610. Among the various types of content included in web page 610 are text content 620, image content 630, input features 640 and navigable links 650, although in other embodiments web page 610 may include more or fewer types of content in various combinations, including types not specifically enumerated above. Although the various content types are illustrated as segregated features, they may be interspersed or combined in any suitable fashion according to the capabilities of the browser and language used to implement web page 610. In one embodiment, browser window 600 may be generated and managed by a web browser such as those mentioned above.

In one embodiment, the content and placement of various content features of web page 610 may be generated, for example by or on behalf of interface 200, to implement a web page through which a merchant 40 may invoke the self-service fulfillment services registration process described above with respect to FIG. 3 and/or the export services registration process described above with respect to FIG. 4. For example, text content 620, image content 630 and input features 640 may be configured to present a fulfillment service provider's request for input data to a merchant 40 and to provide a technique for allowing merchant 40 to enter and convey such data in response, such as through presenting a form with fields in which data may be inserted by the merchant 40. Such input data may in various embodiments include any or all of identifiers of items for which fulfillment and/or export services are requested, export process preferences (e.g., merchant-specified restrictions on items to be exported, eligible international destinations and/or recipients, or the role of the provider or merchant as USPPI for an international order), one or more signatures or logos, or any other information usable by the fulfillment services provider in providing the services described herein.

In another embodiment, web page 610 may be configured to implement an e-commerce channel suitable for presenting offers in commerce of items 35 to customers 50, as well as other data potentially of interest to customers 50. For example, a merchant 40 may operate its own e-commerce hosting facilities, generating its own content and conveying it to customers 50 via web pages 610. Alternatively, a merchant 40 may arrange with another party, such as enterprise 5, to present such web pages 610 on its behalf. In another embodiment, enterprise 5 or another party may implement an e-commerce marketplace such as described above via one or more web pages 610. For example, a number of offers from various merchants 40 for a particular item 35, or for multiple items 35, may be displayed to a customer 50 via web page 610.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of inventory management system 30, interface 200 and/or database 210, as well as the methods illustrated in FIG. 3-6 or any suitable variations or portions thereof. Such program instructions may also be executed to perform computational functions in support of the methods and techniques described above, for example to instantiate operating system functionality, application functionality, and/or any other suitable functions.

Figure 9:
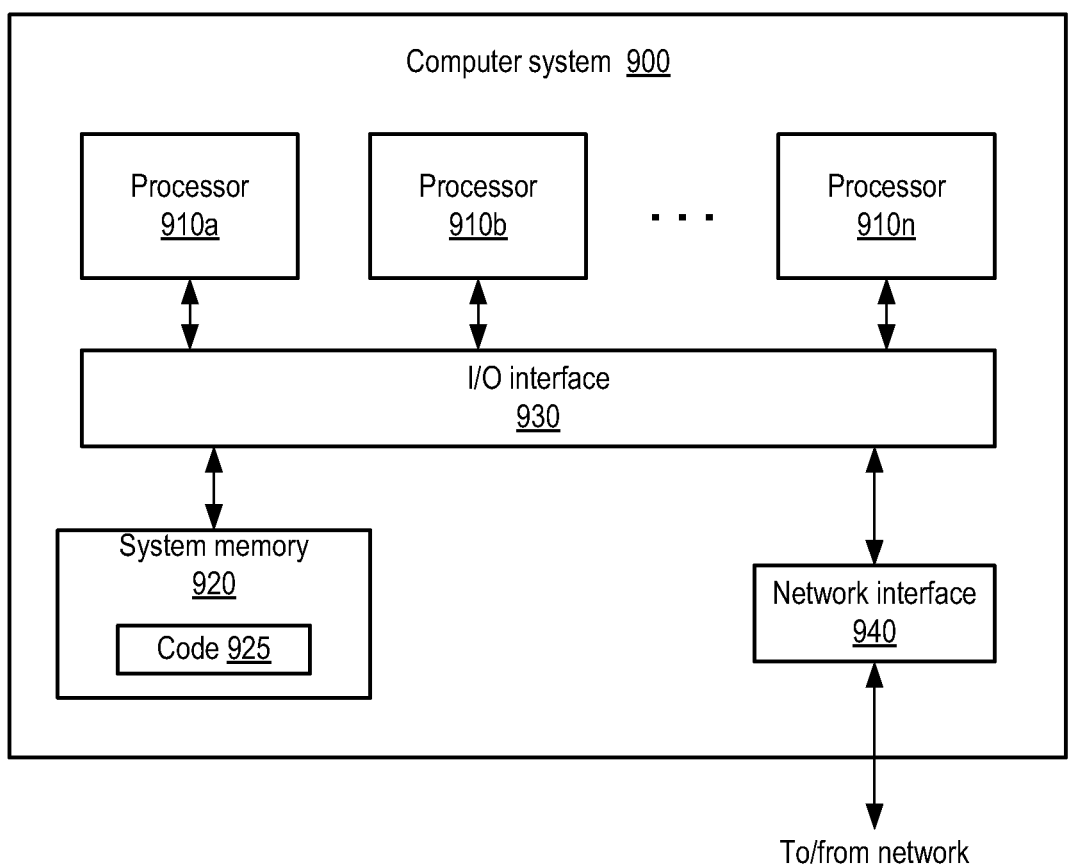
FIG. 9 is a block diagram illustrating an exemplary embodiment of a computer system.

One exemplary embodiment of a computer system including computer-accessible media is illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. In some embodiments, it is contemplated that inventory management system 50 may be implemented using a single instance of computer system 900, while in other embodiments multiple such systems may be configured to host different portions or instances of inventory management system 50. For example, in one embodiment some data sources or services (e.g., purchasing management services) may be implemented via instances of computer system 900 that are distinct from those instances implementing other data sources or services (e.g., order entry/fulfillment services and/or export services). It is noted that in some embodiments, the functions of inventory management system 50 as variously described hereinabove may be partitioned in any suitable fashion into a number of distinct modules, procedures or other functional portions. The resulting portions of inventory management system 50 may then be implemented as a unified or distributed system among one or several instances of computer system 900, for example as instructions executable by one or more of processors 910.

In various embodiments computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

Additionally, it is contemplated that any of the methods or techniques described above and illustrated, for example, in FIGS. 3-6 may be implemented as a web service that may be performed on behalf of clients requesting such services. Generally speaking, providing a function or service as a web service may encompass providing any of a variety of standardized APIs configured to allow different software programs to communicate (e.g., to request services and respond to such requests) in an autonomous, web-based and typically platform-independent manner. For example, an enterprise may choose to expose certain enterprise data (e.g., catalog data, inventory data, customer data or other types of data) and/or certain enterprise functions (e.g., fulfillment service request processing functions, query functions, electronic commerce functions, generic data storage or computational functions, etc.) to external clients (e.g., merchants 40 or customers 50) via a web services interface. Applications could then access the exposed data and/or functions via the web services interface, even though the accessing application may be configured to execute on an entirely different platform (e.g., a different operating system or system architecture) than the platform hosting the exposed data or functions. For example, a merchant 40 may perform self-service registration of an item 35 for fulfillment and/or export services, or may inform fulfillment center 10 of domestic or international order to be fulfilled, through web services calls exposed by interface 200.

In some embodiments, provisioning a web service may encompass the use of particular protocols which may be executable (e.g., as part of code 925) to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in one embodiment a provider of a web service may register the service using a version of the Universal Discovery Description and Integration (UDDI) protocol, which may function as a general directory through which potential resource users may locate web services of interest. The web service provider may also publish specific details regarding how a well-formed web services request from a user should be formatted (e.g., what specific parameters are required or allowed, the data type or format to be used for a given parameter, etc.). For example, such interface details may be published (e.g., within a UDDI directory entry) using a version of the Web Services Description Language (WSDL).

In many embodiments, web services request and response data is exchanged between a client and the service provider through the use of messages or documents formatted as platform-independent structured data, such as a document formatted in compliance with a version of eXtensible Markup Language (XML). For example, in one embodiment a web services request to provide inventory health information for a given inventory item may be embodied in an XML document including fields identifying the item of interest, the type of data requested (e.g., inventory health data), and possibly other fields, in which each field is delimited by an XML tag describing the type of data the field represents. The response to such a request from the web service provider may include an XML document containing the requested data. In some embodiments, web services-related documents may be transmitted between applications making requests and targeted web services using a web-based data transfer protocol, such as a version of the Hypertext Transfer Protocol (HTTP), for example.

Different types of web services requests and responses may yield XML documents that bear little content in common, which may complicate the handling and interpretation of such documents. For example, in different versions of a free-form XML document specifying a web services request, the actual web service that is requested may appear at different places within different document versions, which may require a recipient of the document to buffer or parse a good deal of document data before understanding what the document is for. Consequently, in some embodiments, the XML documents containing web services request/response data may encapsulated within additional XML data used to define a messaging framework, e.g., a generic format for exchanging documents or messages having arbitrary content. For example, in one embodiment web services requests or responses may be XML documents formatted according to a version of the Simple Object Access Protocol (SOAP), which in various versions may define distinct document sections such as an "envelope" (e.g., which may include a specification of the document type, the intended recipient web service, etc.) as well as a message body that may include arbitrary XML message data (e.g., the particular details of the web services request). However, in some embodiments, web services may be implemented using different protocols and standards for publishing services and formatting and exchanging messages.

Additionally, in some embodiments, a web services system may be implemented without using document-based techniques such as SOAP-type protocols. For example, as an alternative to a document-based approach, a web service may be implemented using a Representational State Transfer (REST)-type architecture. Generally speaking, in REST-type architectures, web services requests may be formed as commands conveyed via a transport protocol, such as PUT or GET commands conveyed via a version of the HTTP protocol. Those parameters of the request that might be embedded within a document in a document-based web services architecture may instead be included as command parameters in a REST-type architecture. Other suitable configurations of web services architectures are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a memory storing instructions; and
one or more processors coupled to said memory, wherein executing the instructions on at least one of said one or more processors causes the at least one or more processors to implement an inventory management system, wherein the inventory management system is configured to:
provide a registration interface;
receive, from a merchant via said registration interface, a request to register to receive future export services from a fulfillment services provider, wherein the request is for registration of at least one inventory item to be sold by the merchant and for which fulfillment services are to be provided by the fulfillment services provider in response to receiving one or more customer orders for one or more of the at least one inventory item subsequent to the registration request being approved, and wherein the export services comprise actions performed by the fulfillment services provider to cause the one or more inventory items to be shipped to an international destination on behalf of the merchant and actions performed by the fulfillment services provider to monitor or ensure compliance with applicable export regulations;
determine whether the registration request is valid;
in response to determining that the registration request is valid, store an indication that the merchant is registered to receive export services for the at least one inventory item; and
subsequent to said storing an indication that the merchant is registered to receive export services for the at least one inventory item:
receive an order placed by a customer for one or more of the at least one inventory item, wherein the order comprises an international delivery destination;
in response to receiving the order, determine whether the order is valid; and
in response to determining that the order is valid:
initiate performance of the export services, wherein initiating performance of the export services comprises initiating delivery of the order to the international delivery destination.

2. The system of claim 1, wherein said determining whether the registration request is valid comprises:
prompting the merchant to provide an indication that the at least one inventory item may be legally exported; and
receiving from the merchant an indication that the at least one inventory item may be legally exported.

3. The system of claim 1, wherein said determining whether the registration request is valid comprises one or more of: a comparison of an identifier of the merchant to one or more lists of merchants restricted from exporting items; a criminal background check of the merchant; a credit check of the merchant; or an authentication of the identity of the merchant.

4. The system of claim 1, wherein said determining whether the registration request is valid comprises:
receiving from the merchant a respective identifier for each item of the at least one inventory item; and
comparing the respective identifier for each item of the at least one inventory item to a list of items restricted from export to one or more destinations, entities, or persons.

5. The system of claim 1, wherein said determining whether the registration request is valid comprises:
prompting the merchant to provide an indication that the merchant agrees to comply with regulations applicable to export of the at least one inventory item; and
receiving from the merchant an indication that the merchant agrees to comply with regulations applicable to export of the at least one inventory item.

6. The system of claim 1, wherein the inventory management system is further configured to:
receive from the merchant via said registration interface, a second request to register to receive export services from the fulfillment services provider for a second inventory item;
determine whether the second registration request is valid; and
in response to determining that the second registration request is valid, store an indication that the merchant is registered to receive export services for the second inventory item.

7. The system of claim 1, wherein the inventory management system is further configured to:
receive a signature from the merchant; and
store the signature for use in generating export documentation for an order including the at least one inventory item.

8. The system of claim 1, wherein said initiating performance of the export services further comprises:
in response to determining that the order is valid:
generating export documentation for delivery of the order.

9. The system of claim 1, wherein said determining whether the order is valid comprises searching for the stored indication that that the merchant is registered to receive export services for each of the one or more of the at least one inventory item.

10. The system of claim 1, wherein said determining whether the order is valid comprises comparing an identifier of each of the one or more of the at least one inventory item and the international delivery destination to one or more lists of items restricted for export to the international delivery destination.

11. The system of claim 1, wherein the order comprises an identifier of a receiving entity, and wherein said determining whether the order is valid comprises comparing an identifier of each of the one or more of the at least one inventory item and the identifier of the receiving entity to one or more lists of items restricted for export to particular entities.

12. The system of claim 8, wherein said initiating delivery of the order comprises:
causing a copy of the export documentation to be attached to a shipping container comprising the order;
selecting a carrier for transportation of the order; and initiating release of the shipping container to the selected carrier.

13. The system of claim 8, wherein the inventory management system is further configured to:
   calculate customs duties owed on the order to one or more taxing authorities;
   initiate collection of payment for the customs duties; and
   cause the payment to be remitted to the one or more taxing authorities.

14. The system of claim 8, wherein the export documentation comprises, for each of the one or more of the at least one inventory item, a detailed description of the at least one inventory item, a weight of the item, a value of the item, a total weight of the order, a total value of the order, an indication of purpose, an identifier or logo indicating the merchant as exporter of record, and a merchant signature.

15. The system of claim 1, wherein the inventory management system is further configured to:
   receive, from a second merchant via said registration interface, a second request to register to receive export services from a fulfillment services provider for a second inventory item for which the second merchant is registered to receive fulfillment services from the fulfillment services provider;
   determine whether the second registration request is valid; and
   in response to determining that the second registration request is valid, store an indication that the second merchant is registered to receive export services for the second inventory item.

16. The system of claim 1, wherein the inventory management system is further configured to:
   receive an order placed by a customer for two or more inventory items each registered to receive export services by a respective merchant, at least two of which are different merchants, wherein the order comprises an international delivery destination;
   in response to receiving the order, determine if the order is valid; and
   in response to determining that the order is valid:
      generate export documentation for delivery of the order as a single shipment, wherein the fulfillment services provider assumes a role of exporter of record; and
      initiate delivery of the single shipment to the international delivery destination.

17. The system of claim 1, wherein the inventory management system is further configured to:
   receive an order placed by a customer for two or more inventory items each registered to receive export services by a respective merchant, at least two of which are different merchants, wherein the order comprises an international delivery destination;
   in response to receiving the order, determine if the order is valid; and
   in response to determining that the order is valid:
      generate export documentation for delivery of the order as a plurality of shipments, wherein each of the two or more merchants assumes a role of exporter of record for a respective one of the shipments comprising one or more inventory items registered by the merchant; and
      initiate delivery of the plurality of shipments to the international delivery destination.

18. The system of claim 1, wherein the inventory management system is further configured to:
   monitor compliance of the merchant to regulations applicable to export of the at least one inventory item; and
   in response to determining that the merchant has not complied with regulations applicable to export of the at least one inventory item, rescind an agreement to provide export services to the merchant.

19. A computer-implemented method, comprising:
   receiving, from a merchant via a registration interface, a request to register to receive future export services from a fulfillment services provider, wherein the request is for registration of at least one inventory item to be sold by the merchant and for which fulfillment services are to be provided by the fulfillment services provider in response to receiving one or more customer orders for one or more of the at least one inventory item subsequent to the registration request being approved, and wherein the export services comprise actions performed by the fulfillment services provider to cause the one or more inventory items to be shipped to one or more international destinations on behalf of the merchant and actions performed by the fulfillment services provider to monitor or ensure compliance with applicable export regulations;
   determining whether the registration request is valid;
   in response to determining that the registration request is valid, storing an indication that the merchant is registered to receive export services for the at least one inventory item; and
   subsequent to said storing an indication that the merchant is registered to receive export services for the at least one inventory item:
      receiving an order placed by a customer for one or more of the at least one inventory item, wherein the order comprises an international delivery destination;
      in response to receiving the order, determining whether the order is valid; and
      in response to determining that the order is valid:
         initiating performance of the export services, wherein initiating performance of the export services comprises initiating delivery of the order to the international delivery destination.

20. The method of claim 19, wherein said determining whether the registration request is valid comprises:
   prompting the merchant to provide an indication that the at least one inventory item may be legally exported; and
   receiving from the merchant an indication that the at least one inventory item may be legally exported.

21. The method of claim 19, wherein said determining whether the registration request is valid comprises one or more of: comparing an identifier of the merchant to one or more lists of merchants restricted from exporting items; implementing a criminal background check of the merchant; implementing a credit check of the merchant; or implementing an authentication of the identity of the merchant.

22. The method of claim 19, wherein said determining whether the registration request is valid comprises:
   receiving from the merchant a respective identifier for each item of the at least one inventory item; and
   comparing the respective identifier for each item of the at least one inventory item to a list of items restricted from export to one or more destinations, entities, or persons.

23. The method of claim 19, wherein said determining whether the registration request is valid comprises:
   prompting the merchant to provide an indication that the merchant agrees to comply with regulations applicable to export of the at least one inventory item; and
   receiving from the merchant an indication that the merchant agrees to comply with regulations applicable to export of the at least one inventory item.

24. The method of claim 19, further comprising:
receiving from the merchant via said registration interface, a second request to register to receive export services from the fulfillment services provider for a second inventory item;
determining whether the second registration request is valid; and
in response to determining that the second registration request is valid, storing an indication that the merchant is registered to receive export services for the second inventory item.

25. The method of claim 19, further comprising:
receiving a signature from the merchant; and
storing the signature for use in generating export documentation for an order including the at least one inventory item.

26. The method of claim 19, wherein said initiating performance of the export services further comprises:
in response to determining that the order is valid:
generating export documentation for delivery of the order.

27. The method of claim 19, wherein said determining whether the order is valid comprises searching for the stored indication that the merchant is registered to receive export services for each of the one or more of the at least one inventory item.

28. The method of claim 19, wherein said determining whether the order is valid comprises comparing an identifier of each of the one or more of the at least one inventory item and the international delivery destination to one or more lists of items restricted for export to the international delivery destination.

29. The method of claim 19, wherein the order comprises an identifier of a receiving entity, and wherein said determining whether the order is valid comprises comparing an identifier of each of the one or more of the given at least one inventory item and the identifier of the receiving entity to one or more lists of items restricted for export to particular entities.

30. The method of claim 26, wherein said initiating delivery of the order comprises:
causing a copy of the export documentation to be attached to a shipping container comprising the order;
selecting a carrier for transportation of the order;
initiating release of the shipping container to the selected carrier; and
providing a copy of the export documentation to the selected carrier.

31. The method of claim 26, further comprising:
calculating customs duties owed on the order to one or more taxing authorities;
initiating collection of payment for the customs duties; and
causing the payment to be remitted to the one or more taxing authorities.

32. The method of claim 19, further comprising:
receiving an order placed by a customer for two or more inventory items each registered to receive export services by a respective merchant, at least two of which are different merchants, wherein the order comprises an international delivery destination;
in response to receiving the order, determining if the order is valid; and
in response to determining that the order is valid:
generating export documentation for delivery of the order as one or more shipments; and
initiating delivery of the one or more shipments to the international delivery destination.

33. A computer-readable storage medium storing program instructions that when executed on one or more computers cause the one or more computers to perform:
receiving, from a merchant via said registration interface, a request to register to receive future export services from a fulfillment services provider, wherein the request is for registration of at least one inventory item to be sold by the merchant and for which the merchant wishes to register to receive future export services, wherein fulfillment services are to be provided by the fulfillment services provider in response to receiving one or more customer orders for one or more of the at least one inventory item subsequent to the registration request being approved, wherein the export services comprise actions performed by the fulfillment services provider to cause the one or more inventory items to be shipped to one or more international destinations on behalf of the merchant and actions performed by the fulfillment services provider to monitor or ensure compliance with applicable export regulations;
determining whether the registration request is valid;
in response to determining that the registration request is valid, storing an indication that the merchant is registered to receive export services for the at least one inventory item; and
subsequent to said storing an indication that the merchant is registered to receive export services for the at least one inventory item:
receiving an order placed by a customer for one or more of the at least one inventory item, wherein the order comprises an international delivery destination;
in response to receiving the order, determining whether the order is valid; and
in response to determining that the order is valid:
initiating performance of the export services, wherein initiating performance of the export services comprises initiating delivery of the order to the international delivery destination.

34. The storage medium of claim 33, wherein said determining whether the registration request is valid comprises:
prompting the merchant to provide an indication that the at least one inventory item may be legally exported; and
receiving from the merchant an indication that the at least one inventory item may be legally exported.

35. The storage medium of claim 33, wherein said determining whether the registration request is valid comprises one or more of: comparing an identifier of the merchant to one or more lists of merchants restricted from exporting items; implementing a criminal background check of the merchant; implementing a credit check of the merchant; or implementing an authentication of the identity of the merchant.

36. The storage medium of claim 33, wherein said determining whether the registration request is valid comprises:
receiving from the merchant a respective identifier for each item of the at least one inventory item; and
comparing the respective identifier for each item of the at least one inventory item to a list of items restricted from export to one or more destinations, entities, or persons.

37. The storage medium of claim 33, wherein said determining whether the registration request is valid comprises:
prompting the merchant to provide an indication that the merchant agrees to comply with regulations applicable to export of the at least one inventory item; and
receiving from the merchant an indication that the merchant agrees to comply with regulations applicable to export of the at least one inventory item.

38. The storage medium of claim 33, wherein when executed on the one or more computers, the program instructions further cause the one or more computers to perform:
  receiving from the merchant via said registration interface, a second request to register to receive export services from the fulfillment services provider for a second inventory item;
  determining whether the second registration request is valid; and
  in response to determining that the second registration request is valid, storing an indication that the merchant is registered to receive export services for the second inventory item.

39. The storage medium of claim 33, wherein when executed on the one or more computers, the program instructions further cause the one or more computers to perform:
  receiving a signature from the merchant; and
  storing the signature for use in generating export documentation for an order including the at least one inventory item.

40. The storage medium of claim 33, wherein when executed on the one or more computers, the program instructions further cause the one or more computers to perform:
  in response to determining that the order is valid:
    generating export documentation for delivery of the order.

41. The storage medium of claim 33, wherein said determining whether the order is valid comprises searching for the stored indication that that the merchant is registered to receive export services for each of the one or more of the at least one inventory item.

42. The storage medium of claim 33, wherein said determining whether the order is valid comprises comparing an identifier of each of the one or more of the at least one inventory item and the international delivery destination to one or more lists of items restricted for export to the international delivery destination.

43. The storage medium of claim 33, wherein the order comprises an identifier of a receiving entity, and wherein said determining whether the order is valid comprises comparing an identifier of each of the one or more of the at least one inventory item and the identifier of the receiving entity to one or more lists of items restricted for export to particular entities.

44. The storage medium of claim 40, wherein said initiating delivery of the order comprises:
  causing a copy of the export documentation to be attached to a shipping container comprising the order;
  selecting a carrier for transportation of the order;
  initiating release of the shipping container to the selected carrier; and
  providing an electronic copy of the export documentation to the selected carrier.

45. The storage medium of claim 40, wherein the program instructions are further computer-executable to implement:
  calculating customs duties owed on the order to one or more taxing authorities;
  initiating collection of payment for the customs duties; and
  causing the payment to be remitted to the one or more taxing authorities.

46. The storage medium of claim 40, wherein the program instructions are further computer-executable to implement:
  receiving an order placed by a customer for two or more inventory items each registered to receive export services by a respective merchant, at least two of which are different merchants, wherein the order comprises an international delivery destination;
  in response to receiving the order, determining if the order is valid; and
  in response to determining that the order is valid:
    generating export documentation for delivery of the order as one or more shipments; and
    initiating delivery of the one or more shipments to the international delivery destination.

47. A fulfillment center, comprising:
  an inventory storage facility that stores inventory items on behalf of a merchant; and
  an inventory management system configured to:
    receive, from the merchant, a request to register to receive future export services from a fulfillment services provider, wherein the request is for registration of at least one of said inventory items, and wherein export services are to be provided by the fulfillment services provider in response to receiving one or more customer orders for one or more of the at least one inventory item subsequent to the registration request being approved, wherein said registration request is received via a computer-implemented registration interface, and wherein the export services comprise actions performed by the fulfillment services provider to cause the one or more inventory items to be shipped to one or more international destinations on behalf of the merchant and actions performed by the fulfillment services provider to monitor or ensure compliance with applicable export regulations;
    determine whether said registration request is valid;
    in response to determining that said registration request is valid, store an indication that the merchant is registered to receive export services for the at least one inventory item; and
    subsequent to said storing an indication that the merchant is registered to receive export services for the at least one inventory item:
      receive an order placed by a customer for one or more of the at least one inventory item, wherein the order comprises an international delivery destination;
      in response to receiving the order, determine whether the order is valid; and
      in response to determining that the order is valid:
        initiate performance of the export services, wherein initiating performance of the export services comprises initiating delivery of the order to the international delivery destination.

48. The fulfillment center of claim 47, wherein the inventory management system is further configured to:
  in response to determining that the order is valid:
    generate export documentation for delivery of the order.

* * * * *